US012772281B2

(12) United States Patent
Yin et al.

(10) Patent No.: US 12,772,281 B2
(45) Date of Patent: Oct. 20, 2026

(54) SIGNALING AND CONFIGURATIONS OF SR MULTIPLEXING ON PUSCH

(71) Applicant: SHARP KABUSHIKI KAISHA, Sakai City (JP)

(72) Inventors: Zhanping Yin, Vancouver, WA (US); Kai Ying, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 358 days.

(21) Appl. No.: 18/580,247

(22) PCT Filed: Jun. 24, 2022

(86) PCT No.: PCT/JP2022/025234
§ 371 (c)(1),
(2) Date: Jan. 18, 2024

(87) PCT Pub. No.: WO2023/008014
PCT Pub. Date: Feb. 2, 2023

(65) Prior Publication Data

US 2024/0334471 A1 Oct. 3, 2024

Related U.S. Application Data

(60) Provisional application No. 63/227,255, filed on Jul. 29, 2021.

(51) Int. Cl.
*H04W 4/00* (2018.01)
*H04W 72/21* (2023.01)
*H04W 72/542* (2023.01)
*H04W 72/563* (2023.01)

(52) U.S. Cl.
CPC ......... *H04W 72/563* (2023.01); *H04W 72/21* (2023.01); *H04W 72/542* (2023.01)

(58) Field of Classification Search
CPC .................................................. H04W 72/563
See application file for complete search history.

(56) References Cited

U.S. PATENT DOCUMENTS

2021/0329658 A1* 10/2021 Li ......................... H04W 72/23
2022/0279538 A1* 9/2022 Jung ................... H04W 72/542
2022/0338226 A1* 10/2022 Nemeth ............ H04W 72/1273
2023/0064087 A1* 3/2023 Yin ....................... H04L 1/1854
(Continued)

OTHER PUBLICATIONS

Lenovo et al., "Intra-UE multiplexing enhancement for IIoT/URLLC", R1-2105769, 3GPP TSG RAN WG1 #105, e-Meeting, May 10-27, 2021.
Xiaomi, "Intra-UE multiplexing/prioritization for URLLC/IIoT", R1-2105558, 3GPP TSG RAN WG1 #105-e, e-Meeting, May 10-27, 2021.
(Continued)

*Primary Examiner* — Elisabeth Benoit Magloire
(74) *Attorney, Agent, or Firm* — ScienBiziP, P.C.

(57) ABSTRACT

A user equipment (UE) is described. The UE includes a processor configured to determine, based on a radio resource control (RRC) parameter, scheduling request (SR) multiplexing on a physical uplink shared channel (PUSCH). The UE also includes transmitting circuitry configured to, if at least one physical uplink control channel (PUCCH) for high priority (HP) SR overlaps with a low priority (LP) PUSCH, and if HP SR multiplexing on low priority (LP) PUSCH is configured and enabled, and if there is no positive HP SR, transmit the LP PUSCH with or without negative SR multiplexing.

4 Claims, 19 Drawing Sheets

(56) References Cited

U.S. PATENT DOCUMENTS

| | | | | |
|---|---|---|---|---|
| 2023/0155720 A1* | 5/2023 | Yin | H04L 1/0013 | 370/329 |
| 2023/0189272 A1* | 6/2023 | Shah | H04L 5/0044 | 370/329 |
| 2023/0328727 A1* | 10/2023 | Salah | H04L 5/0055 | 370/329 |
| 2023/0422242 A1* | 12/2023 | Guo | H04W 72/56 | |
| 2024/0215018 A1* | 6/2024 | Wang | H04W 52/365 | |
| 2024/0306185 A1* | 9/2024 | Yin | H04L 1/0026 | |
| 2024/0348379 A1* | 10/2024 | Yin | H04W 72/12 | |
| 2024/0421963 A1* | 12/2024 | Yin | H04W 72/21 | |
| 2025/0089085 A1* | 3/2025 | Yin | H04L 1/1864 | |

OTHER PUBLICATIONS

InterDigital Inc., “Intra-UE multiplexing and prioritization”, R1-2105473, 3GPP TSG RAN WG1 #105-e, e-Meeting, May 10-27, 2021.

Panasonic, “Discussion on Intra-UE multiplexing and prioritization of different priority”, R1-2105144, 3GPP TSG RAN WG1 #105-e, e-Meeting, Apr. 12-20, 2021.

CMCC, “Discussion on intra-UE multiplexing/prioritization”, R1-2104606, 3GPP TSG RAN WG1 #105-e, e-Meeting, May 10-27, 2021.

Nokia et al., “On UL intra-UE multiplexing and prioritization enhancements”, R1-2104310, 3GPP TSG RAN WG1 #105-e, e-Meeting, May 19-27, 2021.

* cited by examiner

302

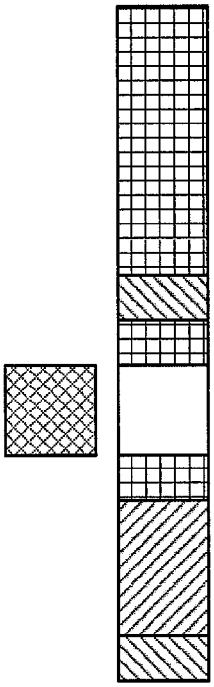
FIG. 14A
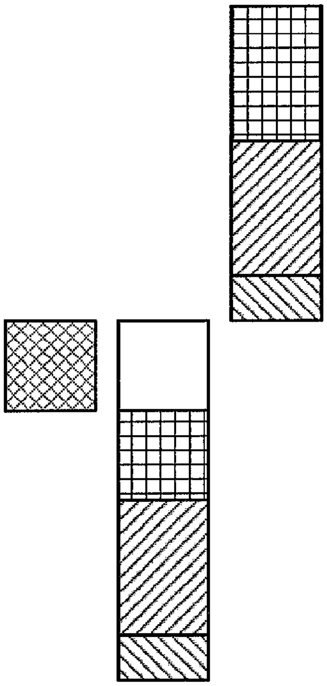
FIG. 14B
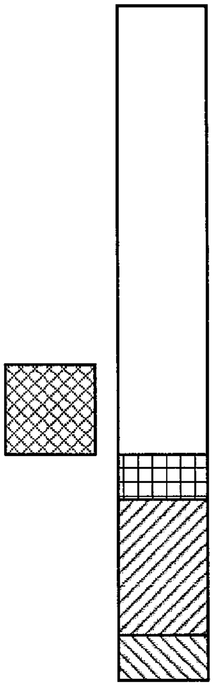
FIG. 14C
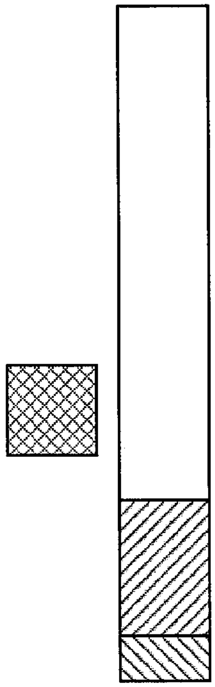
FIG. 14D
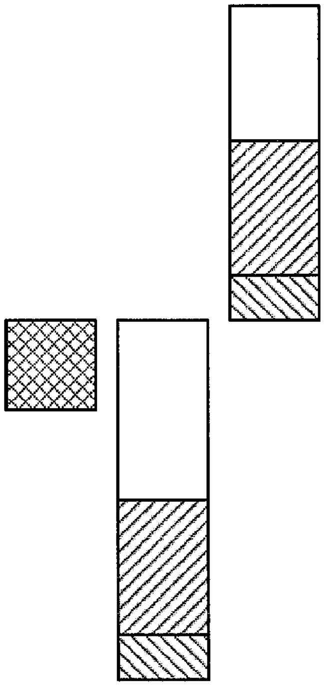
FIG. 14E
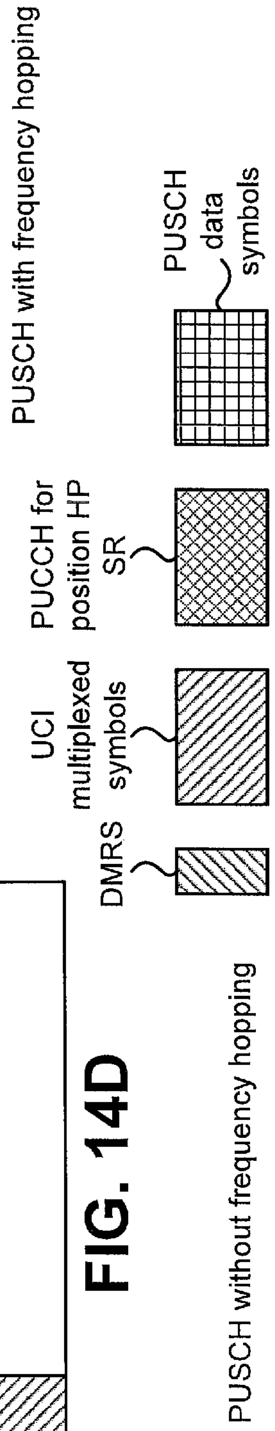

SIGNALING AND CONFIGURATIONS OF SR MULTIPLEXING ON PUSCH

CROSS REFERENCE

This Nonprovisional application claims priority under 35 U.S.C. § 119 on provisional Application No. 63/227,255 on Jul. 29, 2021, the entire contents of which are hereby incorporated by reference.

TECHNICAL FIELD

The present disclosure relates generally to communication systems. More specifically, the present disclosure relates to signaling and configurations of scheduling request (SR) multiplexing on a physical uplink shared channel (PUSCH) and methods of multiplexing a high priority SR on a low priority PUSCH.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a processor configured to determine, based on a radio resource control (RRC) parameter, scheduling request (SR) multiplexing on a physical uplink shared channel (PUSCH); and transmitting circuitry configured to: if at least one physical uplink control channel (PUCCH) for high priority (HP) SR overlaps with a low priority (LP) PUSCH, and if HP SR multiplexing on low priority (LP) PUSCH is configured and enabled, and if there is no positive HP SR, transmit the LP PUSCH with or without negative SR multiplexing.

In one example, a base station (gNB), comprising: a processor configured to determine, based on a radio resource control (RRC) parameter, scheduling request (SR) multiplexing on a physical uplink shared channel (PUSCH); and receiving circuitry configured to: if at least one physical uplink control channel (PUCCH) for high priority (HP) SR overlaps with a low priority (LP) PUSCH, and if HP SR multiplexing on low priority (LP) PUSCH is configured and enabled, and if there is no positive HP SR, receive the LP PUSCH with or without negative SR multiplexing.

BRIEF DESCRIPTION OF DRAWINGS

FIG. 14A is a diagram illustrating a first example of puncturing in accordance with some of the techniques described herein.

FIG. 14B is a diagram illustrating a second example of puncturing in accordance with some of the techniques described herein.

FIG. 14C is a diagram illustrating a third example of puncturing in accordance with some of the techniques described herein.

FIG. 14D is a diagram illustrating a fourth example of puncturing in accordance with some of the techniques described herein.

FIG. 14E is a diagram illustrating a fifth example of puncturing in accordance with some of the techniques described herein.

DESCRIPTION OF EMBODIMENTS

Figure 1:
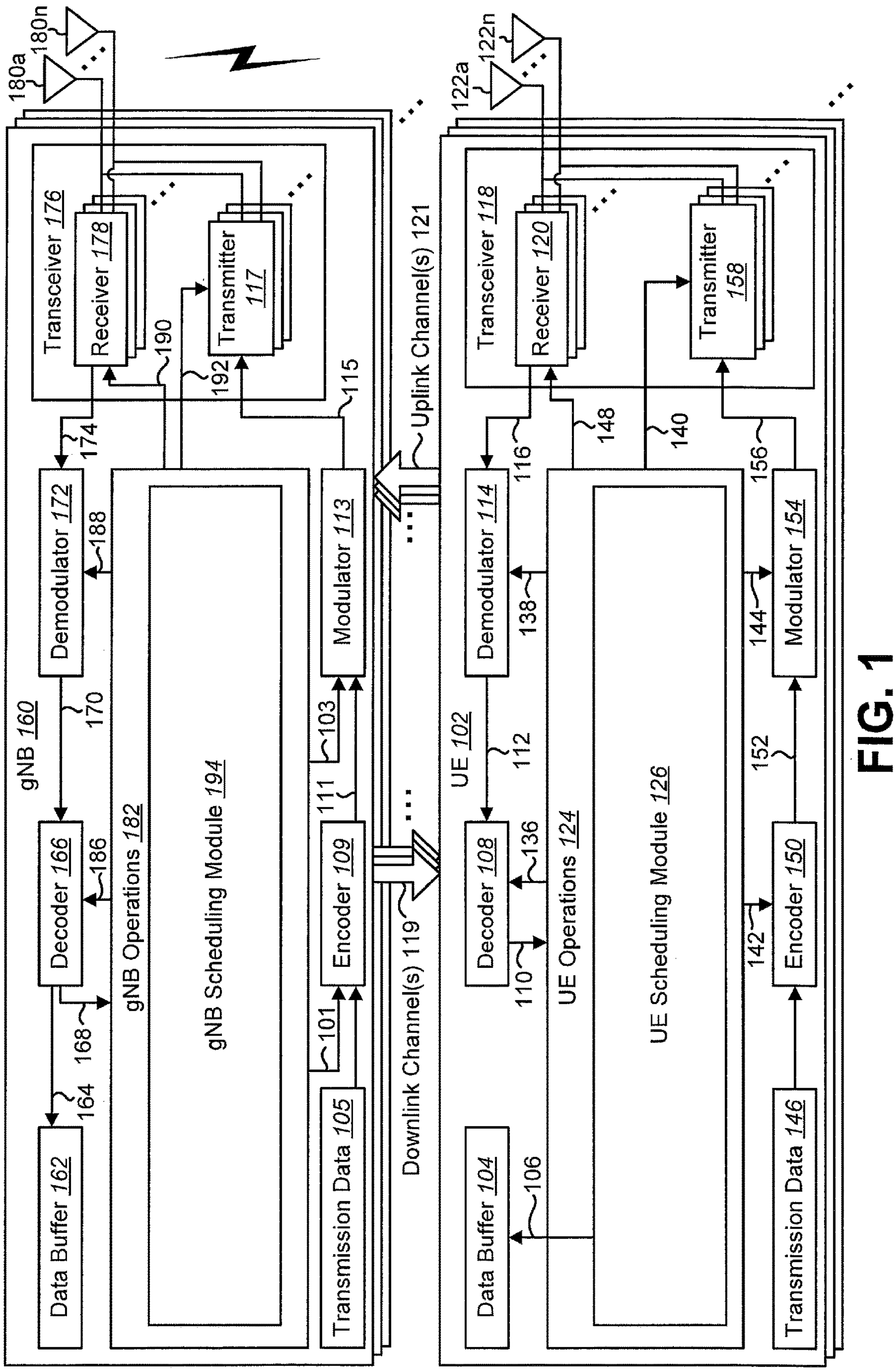
FIG. 1 is a block diagram illustrating one implementation of one or more gNBs 160 and one or more UEs 102 in which systems and methods for channel dropping behaviors may be implemented.

A user equipment (UE) is described. The UE may include a processor configured to determine, based on a radio resource control (RRC) parameter, scheduling request (SR) multiplexing on a physical uplink shared channel (PUSCH). The UE may include transmitting circuitry configured to, if at least one physical uplink control channel (PUCCH) for high priority (HP) SR overlaps with a low priority (LP) PUSCH, and if HP SR multiplexing on low priority (LP) PUSCH is configured and enabled, and if there is no positive HP SR, transmit the LP PUSCH with or without negative SR multiplexing.

The transmitting circuitry may also be configured to, if there is a positive HP SR, and if (a) the positive HP SR is after the start of the LP PUSCH transmission or within a delay SR processing time before the start of the LP PUSCH transmission, or (b) if the positive HP SR multiplexing on LP PUSCH cannot satisfy delay requirements for the positive HP SR, then perform channel dropping between the HP SR PUCCH and the LP PUSCH.

The transmitting circuitry may also be configured to, if there is a positive HP SR, and if a positive HP SR status is known before the LP PUSCH transmission, and if the positive HP SR multiplexing on LP PUSCH can satisfy delay requirements for the positive HP SR, then perform positive HP SR multiplexing on the LP PUSCH and do not transmit the PUCCH for the positive HP SR.

The transmitting circuitry may also be configured to, if HP SR multiplexing on LP PUSCH is not configured and enabled, and if there is no positive HP SR, transmit the LP PUSCH.

A base station (gNB) is described. The gNB may include a processor configured to determine, based on a radio resource control (RRC) parameter, scheduling request (SR) multiplexing on a physical uplink shared channel (PUSCH). The gNB may include receiving circuitry configured to, if at least one physical uplink control channel (PUCCH) for high priority (HP) SR overlaps with a low priority (LP) PUSCH, and if HP SR multiplexing on low priority (LP) PUSCH is configured and enabled, and if there is no positive HP SR, receive the LP PUSCH with or without negative SR multiplexing.

The receiving circuitry may also be configured to, if there is a positive HP SR, and if (a) the positive HP SR is after the start of the LP PUSCH transmission or within a delay SR processing time before the start of the LP PUSCH transmission, or (b) if the positive HP SR multiplexing on LP PUSCH cannot satisfy delay requirements for the positive HP SR, then perform channel dropping between the HP SR PUCCH and the LP PUSCH.

The receiving circuitry may also be configured to, if there is a positive HP SR, and if a positive HP SR status is known before the LP PUSCH transmission, and if the positive HP SR multiplexing on LP PUSCH can satisfy delay requirements for the positive HP SR, then perform positive HP SR multiplexing on the LP PUSCH and do not receive the PUCCH for the positive HP SR.

The receiving circuitry may also be configured to, if HP SR multiplexing on LP PUSCH is not configured and enabled, and if there is no positive HP SR, receive the LP PUSCH.

Another user equipment (UE) is described. The UE may include transmitting circuitry configured to, if at least one physical uplink control channel (PUCCH) for high priority (HP) scheduling request (SR) overlaps with a low priority (LP) PUSCH, and if HP SR multiplexing on LP PUSCH is enabled, and if a positive HP SR is triggered, report the SR in reserved resource element (RE) resources for the SR.

The transmitting circuitry may also be configured to, if a positive HP SR is not triggered, do not report the SR. The transmitting circuitry may also be configured to, if a positive HP SR is not triggered, report a negative SR on reserved RE resources.

The UE may also include a processor configured to use a separate coding chain for the SR.

The transmitting circuitry may also be configured to, if SR, HP HARQ-ACK, LP PUSCH and CSI are all multiplexed on the LP PUSCH, drop the CSI. The transmitting circuitry may also be configured to, if a HARQ-ACK is not multiplexed on the LP PUSCH, then the reserved locations and RE resources for up to two bits of the HARQ-ACK are used as reserved RE resources for the SR.

The transmitting circuitry may also be configured to, if a positive HP SR is not triggered, do not report the SR. The transmitting circuitry may also be configured to, if a positive HP SR is not triggered, report a negative SR as zero (0) on reserved RE resources.

Another base station (gNB) is described. The gNB may include receiving circuitry configured to, if at least one physical uplink control channel (PUCCH) for high priority (HP) scheduling request (SR) overlaps with a low priority (LP) PUSCH, and if HP SR multiplexing on LP PUSCH is enabled, and if a positive HP SR is triggered, receive the SR in reserved resource element (RE) resources for the SR.

The receiving circuitry may also be configured to, if a positive HP SR is not triggered, do not receive the SR. The receiving circuitry may also be configured to, if a positive HP SR is not triggered, receive a negative SR on reserved RE resources.

The gNB may also include a processor configured to use a separate coding chain for the SR.

The receiving circuitry may also be configured to, if SR, HP HARQ-ACK, LP PUSCH and CSI are all multiplexed on the LP PUSCH, drop the CSI. The receiving circuitry may also be configured to, if a HARQ-ACK is not multiplexed on the LP PUSCH, then the reserved locations and RE resources for up to two bits of the HARQ-ACK are used as reserved RE resources for the SR.

The receiving circuitry may also be configured to, if a positive HP SR is not triggered, do not receive the SR. The receiving circuitry may also be configured to, if a positive HP SR is not triggered, receive a negative SR as zero (0) on reserved RE resources.

Another base station (gNB) is described. The gNB may include receiving circuitry configured to receive a low priority (LP) physical uplink shared channel (PUSCH) from a user equipment (UE) where at least one physical uplink control channel (PUCCH) for high priority (HP) scheduling request (SR) overlaps with a LP PUSCH, and where HP SR multiplexing on LP PUSCH is enabled.

The gNB may also include a processor configured to determine whether a positive HP SR is reported in reserved resources for the SR.

The receiving circuitry may also be configured to, if a positive HP SR was reported in reserved resources for the SR, receive and decode data and/or UCI when there is rate matching for the reserved RE resources for the SR. The receiving circuitry may also be configured to, if a positive HP SR was not reported in reserved resources for the SR, receive and decode data and/or UCI without rate matching for the reserved RE resources for the SR.

Another user equipment (UE) is described. The UE may include transmitting circuitry configured to, if at least one physical uplink control channel (PUCCH) for high priority (HP) scheduling request (SR) overlaps with a low priority (LP) PUSCH, and if HP SR multiplexing on LP PUSCH is enabled, use different SR multiplexing methods based on whether HARQ-ACK is multiplexing and a HARQ-ACK priority.

The transmitting circuitry may also be configured to, if there is no HARQ-ACK multiplexed on the PUSCH, report the HP SR following HP HARQ-ACK procedures using reserved REs for HP HARQ-ACK. The transmitting circuitry may also be configured to, if there is HARQ-ACK multiplexed on the PUSCH, report the HP SR jointly with a HARQ-ACK.

The transmitting circuitry may also be configured to, if there is HARQ-ACK multiplexed on the PUSCH, report the HP SR jointly with an HP HARQ-ACK following HP HARQ-ACK multiplexing procedures. The transmitting circuitry may also be configured to, if there is only LP HARQ-ACK multiplexed on the PUSCH, report the HP SR jointly with an LP HARQ-ACK following LP HARQ-ACK multiplexing procedures.

The transmitting circuitry may also be configured to, if there is no HP HARQ-ACK multiplexed on the PUSCH, report the HP SR following HP HARQ-ACK multiplexing procedures using reserved REs for HP HARQ-ACK. The transmitting circuitry may also be configured to, if there is HP HARQ-ACK multiplexed on the PUSCH, report the HP SR jointly with an HP HARQ-ACK following HP HARQ-ACK multiplexing procedures.

The transmitting circuitry may also be configured to, if there is no HARQ-ACK multiplexed on the LP PUSCH, and if a positive HP SR is reported, report the positive HP SR on reserved RE resources for up to 2 bits of HP HARQ-ACK. The transmitting circuitry may also be configured to, if there is no HARQ-ACK multiplexed on the LP PUSCH, and if a positive HP SR is not reported, do not report a negative SR.

The transmitting circuitry may also be configured to, if there is no HARQ-ACK multiplexed on the LP PUSCH, and if a positive HP SR is not reported, report a negative SR as zero (0) on reserved RE resources.

The transmitting circuitry may also be configured to, if there is no HARQ-ACK multiplexed on the LP PUSCH, generate a plurality of HP SR bits based on a number of overlapping HP SR PUCCH resources with the LP PUSCH, regardless of SR status, and multiplex the HP SR bits with HP HARQ-ACK multiplexing on the PUSCH procedure.

The transmitting circuitry may also be configured to, if there is HARQ-ACK multiplexed on the LP PUSCH, generate a single bit for HP SR, wherein the single bit is zero (0) for a negative SR and one (1) for a positive SR. The transmitting circuitry may also be configured to, if there is HARQ-ACK multiplexed on the LP PUSCH, generate a plurality of SR bits based on overlapping HP SR PUCCH resources between the HP SR PUCCH configurations and the LP PUSCH.

The transmitting circuitry may also be configured to, if there is only LP HARQ-ACK multiplexed on the LP PUSCH, generate a single bit for HP SR, wherein the single bit is zero (0) for a negative SR and one (1) for a positive SR. The transmitting circuitry may also be configured to, if there is only LP HARQ-ACK multiplexed on the LP PUSCH, generate a plurality of HP SR bits based on a number of overlapping HP SR PUCCH resources with the LP PUSCH regardless of an SR status.

The transmitting circuitry may also be configured to, if there is only LP HARQ-ACK multiplexed on the LP PUSCH, and if a positive HP SR is reported, report the positive HP SR on reserved RE resources for up to 2 bits of HP HARQ-ACK. The transmitting circuitry may also be configured to, if there is only LP HARQ-ACK multiplexed on the LP PUSCH, and if a positive HP SR is not reported, do not report a negative SR.

The transmitting circuitry may also be configured to, if there is only LP HARQ-ACK multiplexed on the LP PUSCH, and if a positive HP SR is not reported, report a negative SR as zero (0) on reserved RE resources. The transmitting circuitry may also be configured to, if there is only LP HARQ-ACK multiplexed on the LP PUSCH, generate a plurality of HP SR bits based on a number of overlapping HP SR PUCCH resources with the LP PUSCH, regardless of SR status, and multiplex the HP SR bits with an HP HARQ-ACK procedure.

Another base station (gNB) is described. The gNB may include receiving circuitry configured to, if at least one physical uplink control channel (PUCCH) for high priority (HP) scheduling request (SR) overlaps with a low priority (LP) PUSCH, and if HP SR multiplexing on LP PUSCH is enabled, use different SR multiplexing methods based on whether HARQ-ACK is multiplexing and a HARQ-ACK priority.

The receiving circuitry may also be configured to, if there is no HARQ-ACK multiplexed on the PUSCH, receive the HP SR following HP HARQ-ACK procedures using reserved REs for HP HARQ-ACK. The receiving circuitry may also be configured to, if there is HARQ-ACK multiplexed on the PUSCH, receive the HP SR jointly with a HARQ-ACK.

The receiving circuitry may also be configured to, if there is HARQ-ACK multiplexed on the PUSCH, receive the HP SR jointly with an HP HARQ-ACK following HP HARQ-ACK multiplexing procedures. The receiving circuitry may also be configured to, if there is only LP HARQ-ACK multiplexed on the PUSCH, receive the HP SR jointly with an LP HARQ-ACK following LP HARQ-ACK multiplexing procedures.

The receiving circuitry may also be configured to, if there is no HP HARQ-ACK multiplexed on the PUSCH, receive the HP SR following HP HARQ-ACK multiplexing procedures using reserved REs for HP HARQ-ACK. The receiving circuitry may also be configured to, if there is HP HARQ-ACK multiplexed on the PUSCH, receive the HP SR jointly with an HP HARQ-ACK following HP HARQ-ACK multiplexing procedures.

The receiving circuitry may also be configured to, if there is no HARQ-ACK multiplexed on the LP PUSCH, and if a positive HP SR is reported, receive the positive HP SR on reserved RE resources for up to 2 bits of HP HARQ-ACK. The receiving circuitry may also be configured to, if there is no HARQ-ACK multiplexed on the LP PUSCH, and if a positive HP SR is not reported, do not receive a negative SR.

The receiving circuitry may also be configured to, if there is no HARQ-ACK multiplexed on the LP PUSCH, and if a positive HP SR is not reported, receive a negative SR as zero (0) on reserved RE resources. The receiving circuitry may also be configured to, if there is no HARQ-ACK multiplexed on the LP PUSCH, receive a plurality of HP SR bits based on a number of overlapping HP SR PUCCH resources with the LP PUSCH, regardless of SR status, wherein the HP SR bits are and multiplexed with HP HARQ-ACK multiplexing on the PUSCH procedure.

The receiving circuitry may also be configured to, if there is HARQ-ACK multiplexed on the LP PUSCH, receive a single bit for HP SR, wherein the single bit is zero (0) for a negative SR and one (1) for a positive SR. The receiving circuitry may also be configured to, if there is HARQ-ACK multiplexed on the LP PUSCH, receive a plurality of SR bits based on overlapping HP SR PUCCH resources between the HP SR PUCCH configurations and the LP PUSCH.

The receiving circuitry may also be configured to, if there is only LP HARQ-ACK multiplexed on the LP PUSCH, receive a single bit for HP SR, wherein the single bit is zero (0) for a negative SR and one (1) for a positive SR. The receiving circuitry may also be configured to, if there is only LP HARQ-ACK multiplexed on the LP PUSCH, receive a plurality of HP SR bits based on a number of overlapping HP SR PUCCH resources with the LP PUSCH regardless of an SR status.

The receiving circuitry may also be configured to, if there is only LP HARQ-ACK multiplexed on the LP PUSCH, and if a positive HP SR is reported, receive the positive HP SR on reserved RE resources for up to 2 bits of HP HARQ-ACK. The receiving circuitry may also be configured to, if there is only LP HARQ-ACK multiplexed on the LP PUSCH, and if a positive HP SR is not reported, do not receive a negative SR.

The receiving circuitry may also be configured to, if there is only LP HARQ-ACK multiplexed on the LP PUSCH, and if a positive HP SR is not reported, receive a negative SR as zero (0) on reserved RE resources.

The receiving circuitry may also be configured to, if there is only LP HARQ-ACK multiplexed on the LP PUSCH, receive a plurality of HP SR bits based on a number of overlapping HP SR PUCCH resources with the LP PUSCH, regardless of SR status, wherein the HP SR bits are and multiplexed with an HP HARQ-ACK procedure.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In some approaches, scheduling request (SR) multiplexing on a physical uplink shared channel (PUSCH) is not supported. In case of overlapping between a PUCCH with positive SR and a PUSCH, the SR is dropped if the SR priority is the same as the priority of the PUSCH. The channel with a larger priority index (i.e., high priority) is transmitted and the channel with a smaller priority index (i.e., low priority) is dropped. For overlapping between a low priority (LP) PUSCH and a PUCCH with a positive high priority (HP) SR, the PUCCH with the positive HP SR is transmitted, and the LP PUSCH is dropped. For overlapping between a HP PUSCH and a PUCCH with a positive LP SR, the HP PUSCH is transmitted, and the PUCCH with the positive LP SR is dropped.

If a LP PUSCH overlaps with a PUCCH with a positive HP SR, the LP PUSCH is dropped. However, in some approaches, the HP HARQ-ACK may be multiplexed on a LP PUSCH. Accordingly, dropping the LP PUSCH by the HP SR may drop the more important HP HARQ-ACK multiplexed on the PUSCH.

Some examples of the systems and methods described herein may provide enhancements on channel dropping between SR and PUSCH. For instance, some examples of the systems and methods described herein may provide enhancements of channel dropping behavior when a PUCCH with a positive HP SR overlaps with a LP PUSCH transmission. The dropping behavior may be enhanced based on the UCI multiplexed on the PUSCH.

Some examples of the systems and methods described herein may provide simultaneous SR PUCCH and UCI on a PUSCH with partial dropping. For instance, some examples of the systems and method described herein may provide enhancements on channel dropping behavior when a PUCCH with a positive HP SR overlaps with a LP PUSCH transmission. The channel overlapping condition may be evaluated to determine whether the UCI multiplexed on the PUSCH can be simultaneously reported besides the positive HP PUCCH.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for channel dropping behaviors may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform joint coding and/or multiplexing of deferred SPS HARQ-ACK as described herein. For instance, the UE 102, the UE operations module 124, and/or the UE scheduling module 126 may perform one or more of the methods (e.g., method 1200 described in relation to FIG. 12, etc.), operations, functions, approaches, and/or examples described herein.

A high priority UCI may be a high priority HARQ-ACK or a high priority SR. A high priority HARQ-ACK corresponds to a high priority PDSCH transmission. A PDSCH may be dynamically scheduled by downlink control information (DCI) or configured by semi-persistent scheduling (SPS). The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, high priority HARQ-ACK, or high priority PUCCH resource may be configured to support URLLC services. The high priority may be configured with a priority index 1. Thus, a high priority PDSCH/PUSCH may be a PDSCH/PUSCH with priority index 1, a high priority HARQ-ACK may be a HARQ-ACK with priority index 1 corresponding to a PDSCH with priority index 1. A PUCCH resource with priority index 1 may be used to report UCI with priority index 1.

A low priority UCI may be a low priority HARQ-ACK or a low priority SR, or a CSI report, etc. A low priority HARQ-ACK corresponds to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, low priority HARQ-ACK, or low priority PUCCH resource may be configured to support eMBB services. The low priority may be configured with a priority index 0. Thus, a low priority PDSCH/PUSCH may be a PDSCH/PUSCH with priority index 0, a low priority HARQ-ACK may be a HARQ-ACK with priority index 0 corresponding to a PDSCH with priority index 0. A PUCCH resource with priority index 0 may be used to report UCI with priority index 0.

For HARQ-ACK priorities, if a UE 102 is provided a pdsch-HARQ-ACK-Codebook-List, the UE 102 can be indicated by the pdsch-HARQ-ACK-Codebook-List to generate one or two HARQ-ACK codebooks. If the UE 102 is indicated to generate two HARQ-ACK codebooks, a first HARQ-ACK codebook may be associated with a PUCCH of priority index 0 and a second HARQ-ACK codebook may be associated with a PUCCH of priority index 1.

For SR priorities, a UE 102 may be configured, by SchedulingRequestResourceConfig, a set of configurations for SR in a PUCCH transmission using either PUCCH format 0 or PUCCH format 1. A UE 102 may be configured, by schedulingRequestIDForBFR, a configuration for a link recovery request (LRR) in a PUCCH transmission using either PUCCH format 0 or PUCCH format 1. The UE 102 can be configured, by schedulingRequestPriority in SchedulingRequestResourceConfig, a priority index 0 or a priority index 1 for the SR.

A PUSCH or a PUCCH, including repetitions if any, may be of priority index 0 or of priority index 1. If a priority index is not provided for a PUSCH or a PUCCH, the priority index may be 0. If in an active DL BWP a UE 102 monitors PDCCH either for detection of DCI format 0_1 and DCI format 1_1 or for detection of DCI format 0_2 and DCI format 1_2, a priority index may be provided by a priority indicator field. If a UE 102 indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 may schedule a PUSCH transmission of any priority and a DCI format 1_1 or a DCI format 12 may schedule a PDSCH reception and trigger a PUCCH transmission with corresponding HARQ-ACK information of any priority. If, after resolving overlapping for PUCCH and/or PUSCH transmissions of a same priority index, a UE 102 determines to transmit:

- a first PUCCH of larger priority index, a PUSCH or a second PUCCH of smaller priority index, and a transmission of the first PUCCH would overlap in time with a transmission of the PUSCH or the second PUCCH, the UE 102 may not transmit the PUSCH or the second PUCCH;
- a PUSCH of larger priority index, a PUCCH of smaller priority index, and a transmission of the PUSCH would overlap in time with a transmission of the PUCCH, the UE 102 may not transmit the PUCCH; or
- a first PUSCH of larger priority index on a serving cell, a second PUSCH of smaller priority index on the serving cell, and a transmission of the first PUSCH would overlap in time with a transmission of the second PUSCH, the UE 102 may not transmit the second PUSCH, where at least one of the two PUSCH is not scheduled by a DCI format.

In NR Rel-16, a UE 102 may only multiplex UCIs with a same priority index in a PUCCH or a PUSCH. A PUCCH or a PUSCH may be assumed to have a same priority index as a priority index of UCIs a UE 102 multiplexes in the PUCCH or the PUSCH. For intra-UE collision between uplink channels with different priorities, the uplink channel with high priority may be transmitted, and the low priority channel may be dropped.

If a UE 102 is provided two PUCCH-Config:

- if the UE 102 is provided subslotLengthForPUCCH-r16 in the first PUCCH-Config, the PUCCH resource for any SR configuration with priority index 0 or any CSI report configuration in any PUCCH-Config may be within the subslotLengthForPUCCH-r16 symbols in the first PUCCH-Config; or
- if the UE 102 is provided subslotLengthForPUCCH-r16 in the second PUCCH-Config, the PUCCH resource for any SR configuration with priority index 1 in any PUCCH-Config may be within the subslotLengthForPUCCH-r16 symbols in the second PUCCH-Config.

In some examples, if a UE 102 is not provided subslot-Length-ForPUCCH, a slot for an associated PUCCH transmission may include all symbols in a slot, 14 symbols with normal cyclic prefix, or 12 symbols with extended cyclic prefix. And, if a UE 102 is provided subslotLength-ForPUCCH, a slot for an associated PUCCH transmission may include a number of symbols indicated by subslotLength-ForPUCCH.

In some approaches, UCI multiplexing on PUSCH may be performed in accordance with the following. If a PUCCH carrying a UCI overlaps with a PUSCH, the UCI may be multiplexed on PUSCH if simultaneous PUCCH and PUSCH is not configured or supported. In some examples, only HARQ-ACK and CSI may be multiplexed on PUSCH, and SR may not be multiplexed on PUSCH in some approaches.

When UCI is multiplexed on a PUSCH, the overlapping condition of the PUCCH for a UCI type may be evaluated separately with the PUSCH, and the UCI multiplexing of different UCI types may be multiplexed on PUSCH based on the UCI types, for example, the HARQ-ACK may be multiplexed first based on the number of HARQ-ACK bits, followed by CSI which is rate matched after the HARQ-ACK multiplexing.

Offset values may be defined for a UE 102 to determine a number of resources for multiplexing HARQ-ACK information and for multiplexing CSI reports in a PUSCH. Offset values may also be defined for multiplexing configured grant UCI (CG-UCI) in a configured grant PUSCH (CG-PUSCH). The offset values may be signaled to a UE 102 either by a DCI format scheduling the PUSCH transmission or by higher layers.

In Rel-16, for a PUSCH with a given priority index, only the UCI with the same priority that is configured on a PUCCH with the same priority, may be multiplexed on the PUSCH. If the UCI and PUSCH have different priorities, a channel dropping rule is defined so that the high priority channel is transmitted, and the low priority channel is dropped in case of channel overlapping. Dropping timelines are defined for different types of UL channels and UCI types.

In NR Rel-17, UCI of different priorities may be multiplexed on a single PUCCH or PUSCH. Furthermore, a UCI with a given priority may be multiplexed on a PUSCH with different priorities. Thus, using HARQ-ACK as an example, the followings UCI multiplexing scenarios may be supported:

HP HARQ-ACK on HP PUSCH
LP HARQ-ACK on LP PUSCH
HP HARQ-ACK on LP PUSCH
LP HARQ-ACK on HP PUSCH

Different offset values or sets of offset values may be configured for different combinations between the HARQ-ACK priority and PUSCH priority. Furthermore, HARQ-ACK of different priorities may be reported on a single PUSCH, including:

HP HARQ-ACK and LP HARQ-ACK on LP PUSCH
HP HARQ-ACK and LP HARQ-ACK on HP PUSCH

CSI may be treated as low priority in Rel-16. If CSI is present on a LP PUSCH, the HP UCI may also be multiplexed on a LP PUSCH, including HP HARQ-ACK and CSI on LP PUSCH
HP HARQ-ACK, LP HARQ-ACK and CSI on LP PUSCH The CSI may be a periodic CSI, a semi-persistent CSI, or an aperiodic CSI. When multiplexed together with HP UCI on PUSCH, the low priority CSI may be limited to CSI part 1 only.

In Rel-17, CSI enhancements may be considered, and some new CSI reports may be supported for URLLC or the high priority service. The new CSI reports may be treated as high priority, or indicated as high priority (i.e., priority index 1). The HP CSI may be reported together with HP HARQ-ACK on a PUCCH or PUSCH.

Some approaches for collision handling between PUCCH with positive SR and PUSCH are described as follows. The Scheduling Request (SR) is a special physical layer message for UE 102) used for requesting UL-SCH resources for a new transmission. The MAC entity may be configured with zero, one, or more SR configurations. An SR configuration may include a set of PUCCH resources for SR across different BWPs and cells. For a logical channel or for SCell beam failure recovery and for consistent listen before talk (LBT) failure recovery, at most one PUCCH resource for SR may be configured per bandwidth part (BWP).

Each SR configuration may correspond to one or more logical channels and/or to SCell beam failure recovery and/or to consistent LBT failure recovery. Each logical channel, SCell beam failure recovery, and/or consistent LBT failure recovery may be mapped to zero or one SR configuration, which is configured by RRC. The SR configuration of the logical channel that triggered a buffer status report (BSR) or the SCell beam failure recovery or the consistent LBT failure recovery (if such a configuration exists) is considered as corresponding SR configuration for the triggered SR. Any SR configuration may be used for an SR triggered by Pre-emptive BSR.

A UE 102 may be configured, by SchedulingRequestResourceConfig, a set of configurations for SR in a PUCCH transmission using either PUCCH format 0 or PUCCH format 1. A UE 102 may be configured, by schedulingRequestID-BFR-SCell-r16, a configuration for LRR in a PUCCH transmission using either PUCCH format 0 or PUCCH format 1. The UE 102 may be provided, by phy-PriorityIndex-r16 in SchedulingRequestResourceConfig, a priority index 0 or a priority index 1 for the SR. If the UE 102 is not provided a priority index for SR, the priority index may be 0.

The UE 102 may transmit a PUCCH in the PUCCH resource for the corresponding SR configuration only when the UE 102 transmits a positive SR. For a positive SR transmission using PUCCH format 0, the UE 102 may transmit the PUCCH by obtaining initial cycle shift $m_0$ as described for HARQ-ACK information and by setting an additional cycle shift $m_{cs}=0$. For a positive SR transmission using PUCCH format 1, the UE 102 may transmit the PUCCH by setting the information bit b(0)=0. If the PUCCH for a positive SR does not overlap with another PUCCH or PUSCH, the PUCCH for the positive SR may be transmitted at the configured PUCCH resource.

Figure 8:
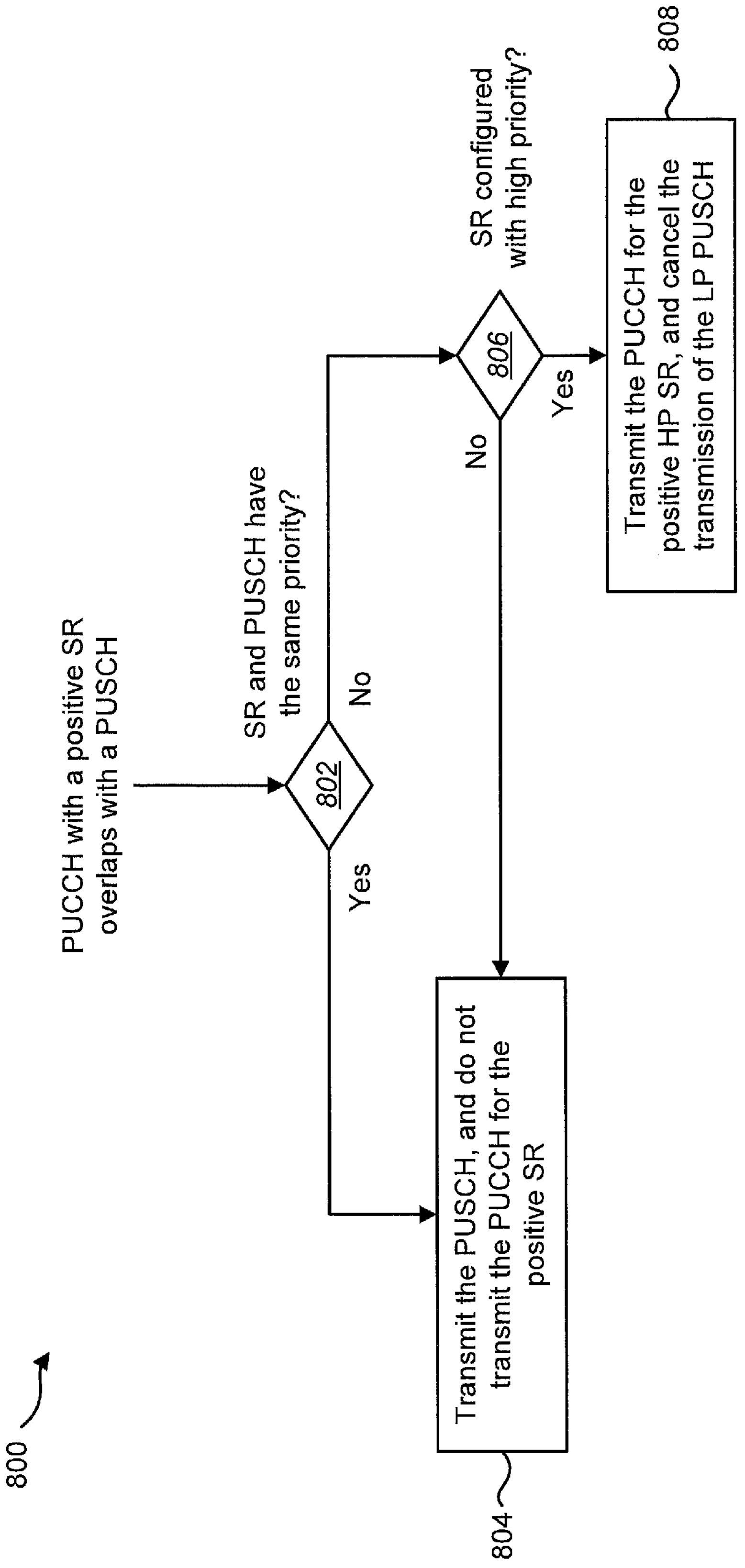
FIG. 8 is a flow diagram illustrating a method by a UE for handling SR and PUSCH collision.

In NR, up to 8 SR may be configured. In some NR approaches, the SR cannot be reported on PUSCH as illustrated in FIG. 8. Some problems may occur with dropping for a SR collision with PUSCH. Since SR cannot be multiplexed on a PUSCH in those approaches, the channel dropping approaches may function for some scenarios (e.g., the SR is dropped if the PUCCH of a positive SR overlaps with a PUSCH with the same priority, and the LP SR is dropped if the PUCCH of a positive SR with priority index 0 overlaps with a PUSCH with a priority index 1). In these approaches, however, for overlapping between a PUCCH with a positive SR with high priority and a PUSCH with low priority, the PUCCH with high priority SR has a high priority and will be transmitted, and the PUSCH with low priority is dropped. For example, if a UE would transmit the following channels that would overlap in time between a first PUCCH of larger priority index with SR and a PUSCH of smaller priority index, the UE is expected to cancel the PUSCH transmissions of smaller priority index before the first symbol overlapping with the PUCCH transmission of the larger priority index. This behavior ensures that the high priority SR is reported with a tradeoff of a dropped LP PUSCH transmission. Since an SR may only carry 1 bit information, the overhead of dropping a PUSCH is significant because the base station (e.g., gNB) may need to reschedule for the UE to retransmit the PUSCH. Furthermore, since UCI can be multiplexed on a LP PUSCH, dropping the LP PUSCH by a HP SR PUCCH may also drop UCI multiplexed on the LP PUSCH. Especially, if a high priority HARQ-ACK is multiplexed on a LP PUSCH, dropping the LP PUSCH by a HP SR PUCCH may drop the more important HP HARQ-ACK information on the LP PUSCH.

Some of the systems and methods described herein may provide enhancements relative to channel dropping between SR and PUSCH. For example, some of the techniques described herein may utilize UCI multiplexing enhancements between UCIs with different priorities and/or UCI multiplexing on a channel with different priority. In some examples, with support of multiplexing of UCI with different priorities on PUSCH, channel dropping behavior may be determined based on the priority of UCI multiplexed on PUSCH. In some examples, UE 102 channel dropping behavior may be enhanced to differentiate the PUSCH with or without multiplexed UCI and the UCI priorities. For instance, the UE 102 channel dropping behavior may be enhanced for the case where SR PUCCH of a positive SR with priority index 1 overlaps with a PUSCH with a priority index 0. In some examples of the techniques described herein, a UE (e.g., UE 102) may transmit or may not transmit information (e.g., PUSCH, PUCCH, UCI, SR, and/or HARQ-ACK, etc.). In some examples, a base station (e.g., eNB 160) correspondingly may receive or may not receive the information (e.g., PUSCH, PUCCH, UCI, SR, and/or HARQ-ACK, etc.) described in relation to a UE herein.

Figure 9:
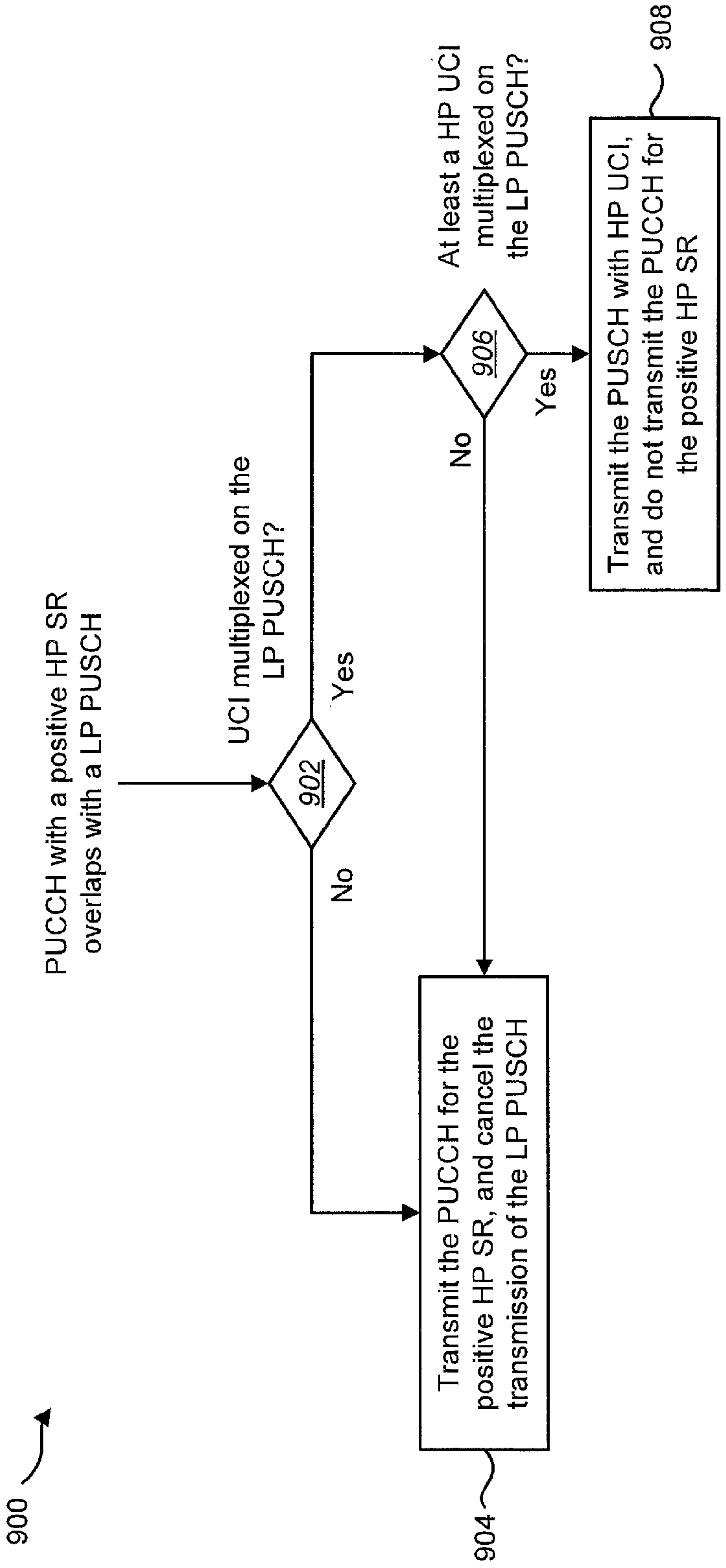
FIG. 9 is a flow diagram illustrating another method by a UE for handling SR and PUSCH collision.

In some approaches for channel dropping enhancement when a PUCCH with a positive HP SR overlaps with a LP PUSCH, if HP UCI is multiplexed on the LP PUSCH, the HP SR may be dropped. Otherwise, if no HP UCI is multiplexing the LP PUSCH, the HP SR may be reported. For example, in case of a PUCCH where a positive HP SR overlaps with a LP PUSCH, whether the LP PUSCH is cancelled by a HP SR or not may be further determined by the priority of the UCIs carried on the LP PUSCH. The method 900 described in relation to FIG. 9 illustrates an example of techniques that may be utilized in accordance with some of the systems and methods described herein. For example, the UE 102 (e.g., UE operations module 124 and/or UE scheduling model 126) may perform one or more of the operations described in relation to FIG. 9. In some examples, the UE 102 may perform one or more of the operations described in relation to FIG. 8.

Some examples of the techniques described herein may provide simultaneous SR PUCCH and UCI on PUSCH with partial dropping. In some examples of the channel dropping described above, only one channel may be transmitted, and the other channel may be dropped. The LP PUSCH may have HP UCI and/or LP UCI multiplexed on it. In case of UCI multiplexed on PUSCH, either the positive HP SR or the UCI on PUSCH may be reported, but not both, in some examples. If there is no high priority UCI (e.g., HP HARQ-ACK) multiplexed on a LP PUSCH, the previous dropping behavior may be utilized so that only the PUCCH for the positive HP SR is transmitted. Thus, the LP PUSCH may be dropped, and the HP SR PUCCH may be transmitted. In this case, the LP PUSCH may be a PUSCH with or without data, and with or without other UCIs such as a LP HARQ-ACK or a CSI, etc., for example. If the LP PUSCH is dropped, the UCI multiplexed on the LP PUSCH (e.g., LP HARQ-ACK and/or CSI) may also be dropped and may not be received by a gNB.

Additional or alternative enhancement may be utilized to allow reporting of both the HP positive SR and the UCI multiplexed on the PUSCH if some conditions are satisfied. This may be particularly beneficial if the UCI is a HARQ-ACK.

In some examples, advanced dropping approaches with potentially simultaneous SR PUCCH and UCI reporting on PUSCH may be provided as a separate UE 102 feature. In some examples, the feature may be configured by the gNB 160 via higher layer signaling (e.g., RRC signaling). In some examples, the feature may be configured with a new RRC parameters (e.g., simultanousSRandPUSCH. etc.). In some examples, the feature may be supported by UE 102 capabilities. In some examples, the feature may be configured only if a UE 102 is capable of supporting such a feature.

In some approaches, if there is no UCI multiplexed on the LP PUSCH, the PUCCH for the positive HP SR may be transmitted and the PUSCH transmission may be cancelled. If there is UCI multiplexed on the LP PUSCH, whether a UCI multiplexed on the PUSCH can be reported simultaneously with the HP SR PUCCH may be determined based whether a HP SR PUCCH resource overlaps with any UCI carrying symbols and/or the corresponding DMRS for the UCI carrying symbols. If there is overlap, simultaneous reporting may not be performed, and channel dropping rules based on the multiplexed UCI priority may be applied.

Examples of detailed scenarios for advanced dropping techniques with overlapping condition evaluations are provided below for different types of UCI combinations.

Figure 10:
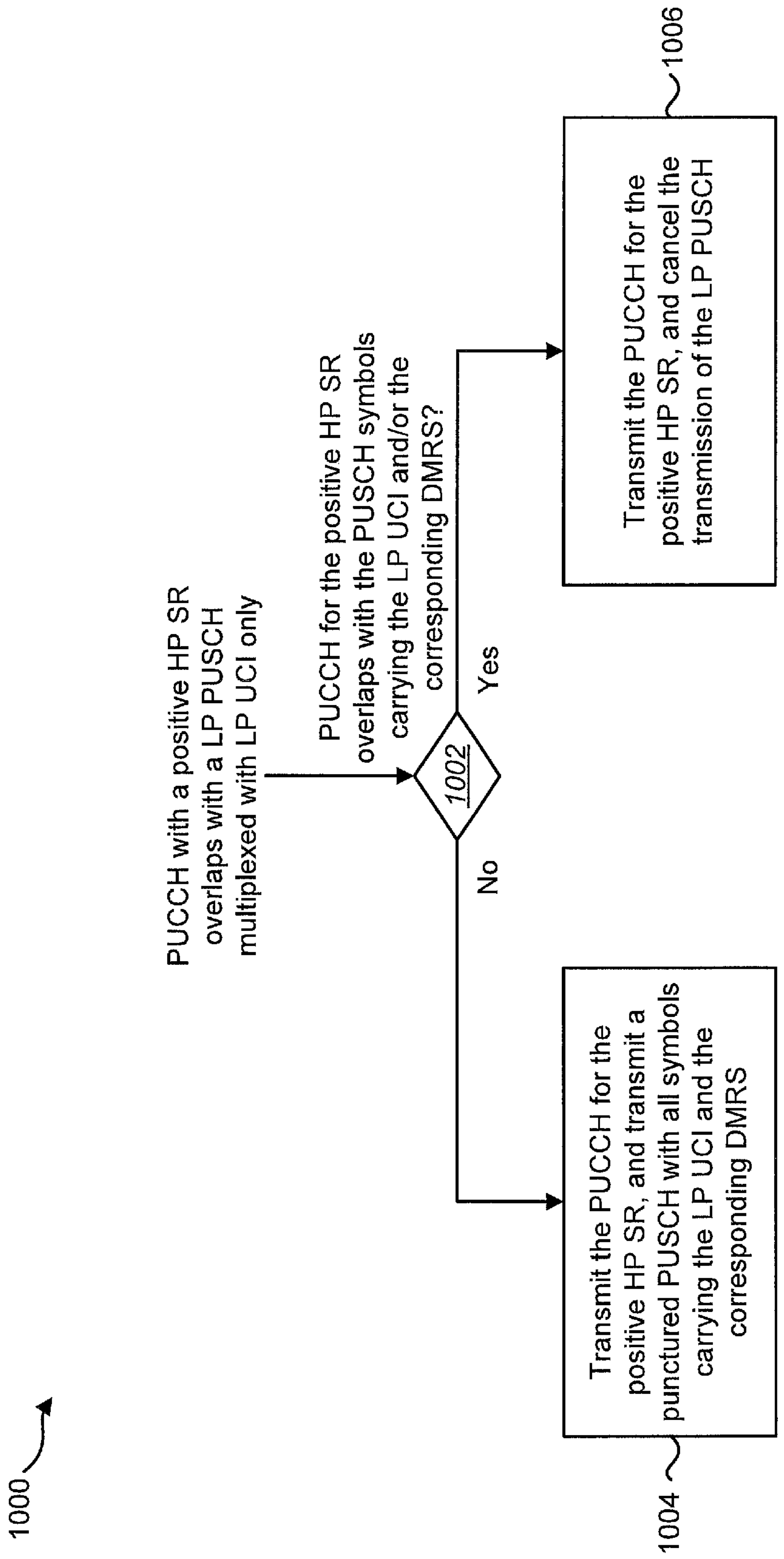
FIG. 10 is a flow diagram illustrating a method by a UE for reporting both LP UCI on PUSCH and HP SR in overlapping conditions.

In Case 1, a PUCCH for a positive HP SR overlaps with a LP PUSCH multiplexed with LP UCI only. If there is no high priority UCI multiplexed on a LP PUSCH, but LP UCI is multiplexed on the LP PUSCH, techniques may be implemented for the LP UCI, where the UE 102 (e.g., UE operations module 124, UE scheduling module 126, etc.) may evaluate some timing conditions to determine the dropping behavior, as shown in FIG. 10.

In a scenario where both LP HARQ-ACK and CSI are multiplexed on the LP PUSCH, one or more approaches may be utilized in accordance with the techniques described herein. In one approach, the overlapping conditions may be evaluated based on the LP HARQ-ACK only to determine the dropping behavior as described herein. The CSI may not be considered.

Alternatively, in some approaches, the overlapping conditions may be evaluated based on the LP HARQ-ACK and CSI part 1 to determine the dropping behavior as described herein. The CSI part 2, if present, may not be considered in some examples.

Figure 11:
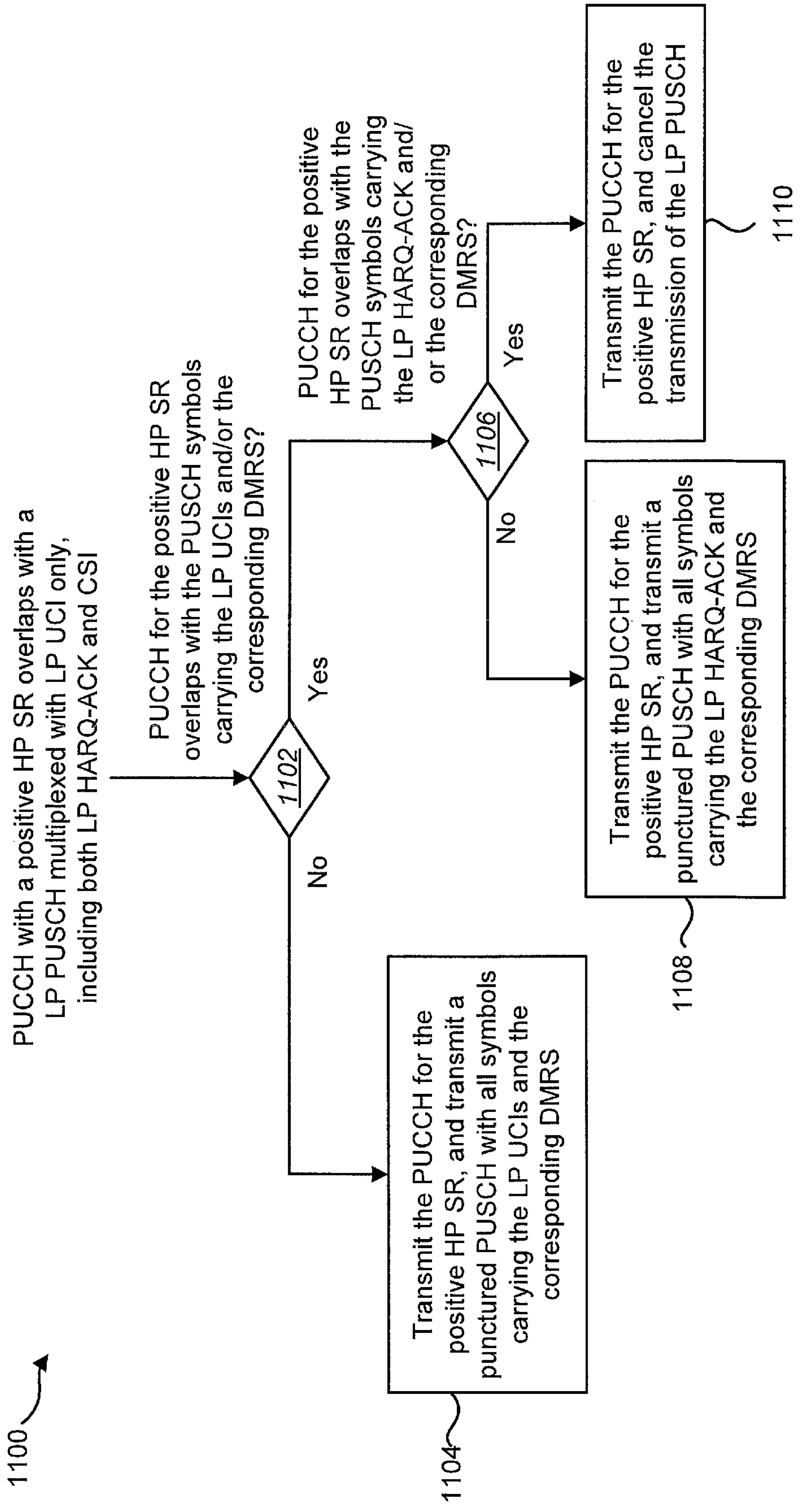
FIG. 11 is a flow diagram illustrating a method by a UE for reporting multiple LP UCIs on PUSCH and HP SR by overlapping conditions.

Additionally or alternatively, in some approaches, several operations may be performed as shown in FIG. 11. For instance, the UE 102 may perform one or more of the operations described in relation to FIG. 11. In these approaches, the overlapping conditions may be evaluated based on symbols carrying both HARQ-ACK and CSI first.

In Case 2, a PUCCH for a positive HP SR overlaps with a LP PUSCH multiplexed with HP UCI. For example, a PUCCH with a positive HP SR may overlap with a LP PUSCH, and if there is at least a high priority UCI (e.g., a HP HARQ-ACK) multiplexed on the LP PUSCH, the UE 102 may evaluate some timing conditions to determine the dropping behavior. An example of overlapping condition evaluation between HP UCI and HP SR is given in relation to FIG. 12. In some examples, the UE 102 may perform one or more of the operations described in relation to FIG. 12.

In Case 3, a PUCCH for a positive HP SR overlaps with a LP PUSCH multiplexed with both HP and LP UCI. UCI with different priorities may be multiplexed on a single PUSCH. Accordingly, the following variations are possible:

HP HARQ-ACK and LP HARQ-ACK multiplexed on a LP PUSCH

HP HARQ-ACK, LP HARQ-ACK, and CSI multiplexed on a LP PUSCH

In an example where a PUCCH with a positive HP SR overlaps with a LP PUSCH multiplexed with UCIs with different priorities, the method given in association with Case 2 may be used by evaluating overlapping conditions with only the HP UCI (e.g., HP HARQ-ACK). Additionally or alternatively, the overlapping conditions may be evaluated in several steps based on symbols carrying both HP UCI and LP UCI, as described in relation to FIG. 13, which may assume that all UCIs are present, including HP HARQ-ACK, LP HARQ-ACK, and CSI. In some examples, the UE 102 may perform one or more of the operations described in relation to FIG. 13.

Some examples of the procedures described herein may evaluate all UCIs first and then may remove the UCIs in steps from low priority to high priority according to whether UCI can be reported, and if so, what UCIs can be reported on PUSCH. If there is UCI multiplexed on the LP PUSCH, whether a UCI multiplexed on the PUSCH can be reported simultaneously with the HP SR PUCCH may be determined based whether the HP SR PUCCH resource overlaps with any UCI carrying symbols and/or the corresponding DMRS for the UCI carrying symbols. If there is overlap, simultaneous reporting may not be performed for the given UCI and/or channel dropping rules based on the multiplexed UCI priority may be applied.

In some examples, taking all potential UCIs on the LP PUSCH into account, to minimize the dropping of multiplexed UCI on PUSCH, the overlapping evaluation may be performed in several steps:

1. If there is no UCI multiplexed on the LP PUSCH, the UE 102 may transmit the PUCCH for the positive HP SR and may cancel the transmission of the LP PUSCH.
2. If there is at least one UCI multiplexed on the LP PUSCH, the UE 102 may evaluate whether all UCIs multiplexed on the PUSCH may be reported simultaneously with the HP SR PUCCH.
3. If the HP SR PUCCH resource does not overlap with any UCI carrying symbols and/or the corresponding DMRS for the UCI carrying symbols, all UCIs multiplexed on the PUSCH may be reported simultaneously with the HP SR PUCCH. Thus, the UE 102 may transmit the PUCCH for the HP positive SR and may transmit a punctured PUSCH with at least all symbols carrying the UCIs and the corresponding DMRS in the PUSCH.
4. If the HP SR PUCCH resource overlaps with any UCI carrying symbols and/or the corresponding DMRS for the UCI carrying symbols, the UE 102 may determine if HARQ-ACK, including HP HARQ-ACK and/or LP HARQ-ACK, is multiplexed on the LP PUSCH.
5. If the UE 102 determines that HARQ-ACK is not multiplexed on the LP PUSCH, and only CSI is multiplexed on the LP PUSCH, the UE 102 may transmit the PUCCH for the positive HP SR and may cancel the transmission of the LP PUSCH.
6. If the UE 102 determines that HARQ-ACK is multiplexed on the LP PUSCH, the UE 102 may further evaluate whether all HARQ-ACKs (including HP HARQ-ACK if present and/or LP HARQ-ACK if present) multiplexed on the PUSCH may be reported simultaneously with the HP SR PUCCH.
7. If the HP SR PUCCH resource does not overlap with any HARQ-ACK carrying symbols and/or the corresponding DMRS for the HARQ-ACK carrying symbols, all HARQ-ACKs multiplexed on the PUSCH may be reported simultaneously with the HP SR PUCCH. Thus, the UE 102 may transmit the PUCCH for the HP positive SR and may transmit a punctured PUSCH with at least all symbols carrying the HARQ-ACKs and the corresponding DMRS in the PUSCH.
8. If the HP SR PUCCH resource overlaps with any HARQ-ACK carrying symbols and/or the corresponding DMRS for the HARQ-ACK carrying symbols, the UE 102 may further determine if HP HARQ-ACK is multiplexed on the LP PUSCH.
9. If the UE 102 determines that HP HARQ-ACK is not multiplexed on the LP PUSCH, and only LP HARQ-ACK is multiplexed on the LP PUSCH, the UE 102 may transmit the PUCCH for the positive HP SR and may cancel the transmission of the LP PUSCH.
10. If the UE 102 determines that HP HARQ-ACK is multiplexed on the LP PUSCH, the UE 102 may further evaluate whether HP HARQ-ACK multiplexed on the PUSCH may be reported simultaneously with the HP SR PUCCH.
11. If the HP SR PUCCH resource does not overlap with any HP HARQ-ACK carrying symbols and/or the corresponding DMRS for the HP HARQ-ACK carrying symbols, the HP HARQ-ACK multiplexed on the PUSCH may be reported simultaneously with the HP SR PUCCH. Thus, the UE 102 may transmit the PUCCH for the HP positive SR and may transmit a punctured PUSCH with at least all symbols carrying the HP HARQ-ACKs and the corresponding DMRS in the PUSCH.
12. If the HP SR PUCCH resource overlaps with any HP HARQ-ACK carrying symbols and/or the corresponding DMRS for the HP HARQ-ACK carrying symbols, the HP HARQ-ACK multiplexed on the PUSCH may not be reported simultaneously with the HP SR PUCCH. The UE 102 may transmit the PUSCH with all multiplexed UCIs and may not transmit the PUCCH for the positive HP SR.

In some examples, the foregoing procedure can be simplified by considering only HARQ-ACK. For example, steps 2-4 may be removed and the evaluation may be performed from step 5 directly in case of UCI that is multiplexed on the LP PUSCH. In some examples, the foregoing procedure may be further simplified by considered only HP UCI. For example, the procedure may fall back to the flowchart in FIG. 12 for Case 2 above.

In some examples, the foregoing procedure evaluates all UCIs first. If all UCIs will not fit, then it may be checked whether the maximum UCI can be reported simultaneously with the SR PUCCH. Alternatively, a “water filling” approach may be used considering all potential UCIs on the LP PUSCH. Accordingly, the overlapping evaluation may be performed in steps from the UCIs with highest priority first. The UE 102 may try to keep the symbols for different types of UCIs as much as possible if simultaneous reporting with the positive HP SR PUCCH is possible.

In some examples, LP PUSCH puncturing behaviors may be utilized. One or more of several different approaches may be utilized. For example, the UE 102 and/or the gNB 160 may utilize puncturing as described in relation to one or more of FIGS. 14A, 14B, 14C, 14D, and/or 14E.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein. In some examples, the gNB scheduling module 194 may be utilized to configure dropping and/or puncturing procedures and/or to receive communications from a UE in accordance with the dropping and/or puncturing procedures described herein. For instance, the gNB 160, the gNB operations module 182, and/or the gNB scheduling module 194 may receive transmissions from the UE in accordance with one or more of the methods (e.g., methods 800, 900, 1000, 1100, 1200, 1300 described in relation to FIG. 13, etc.), operations, functions, approaches, and/or examples described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
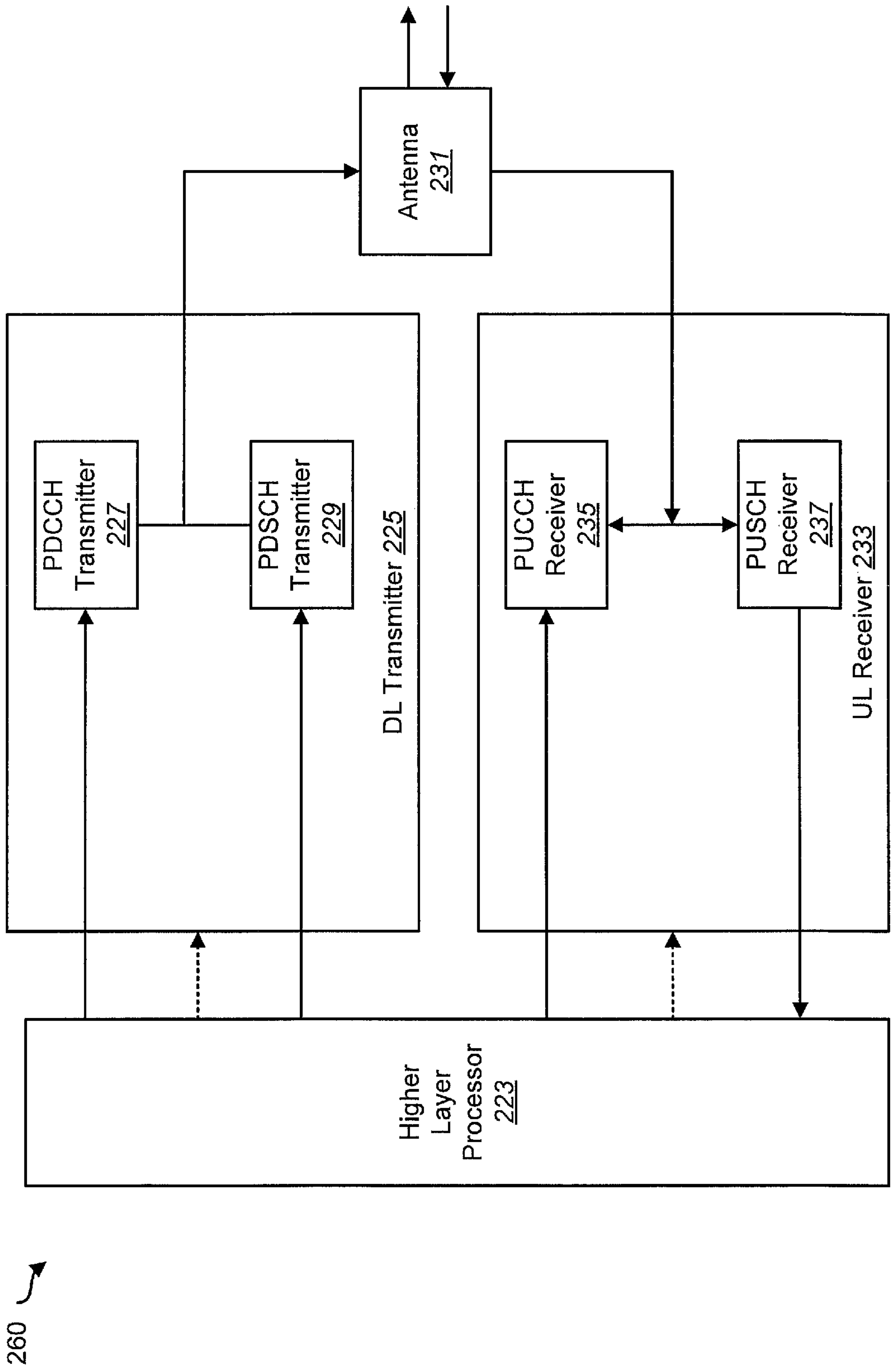
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
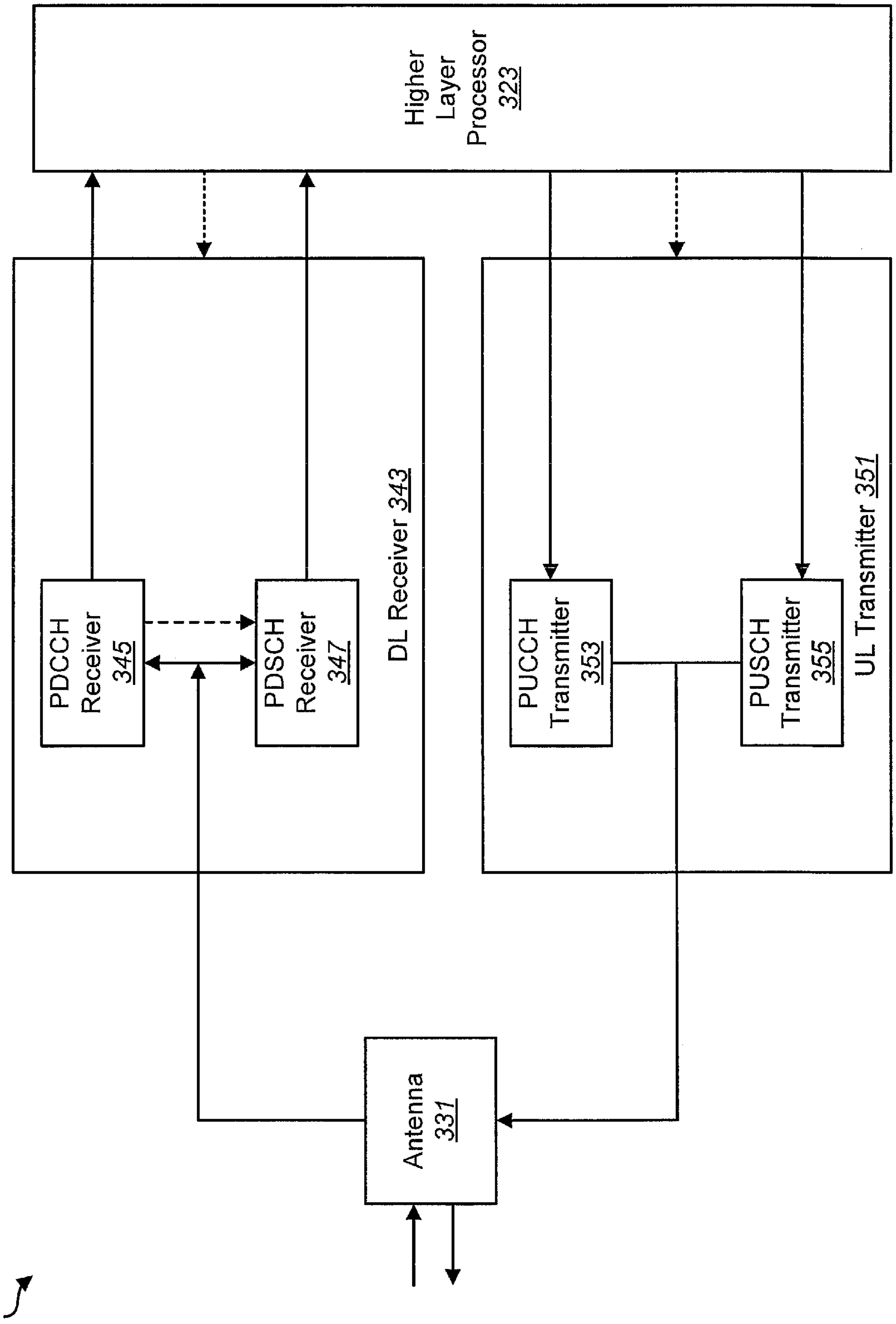
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
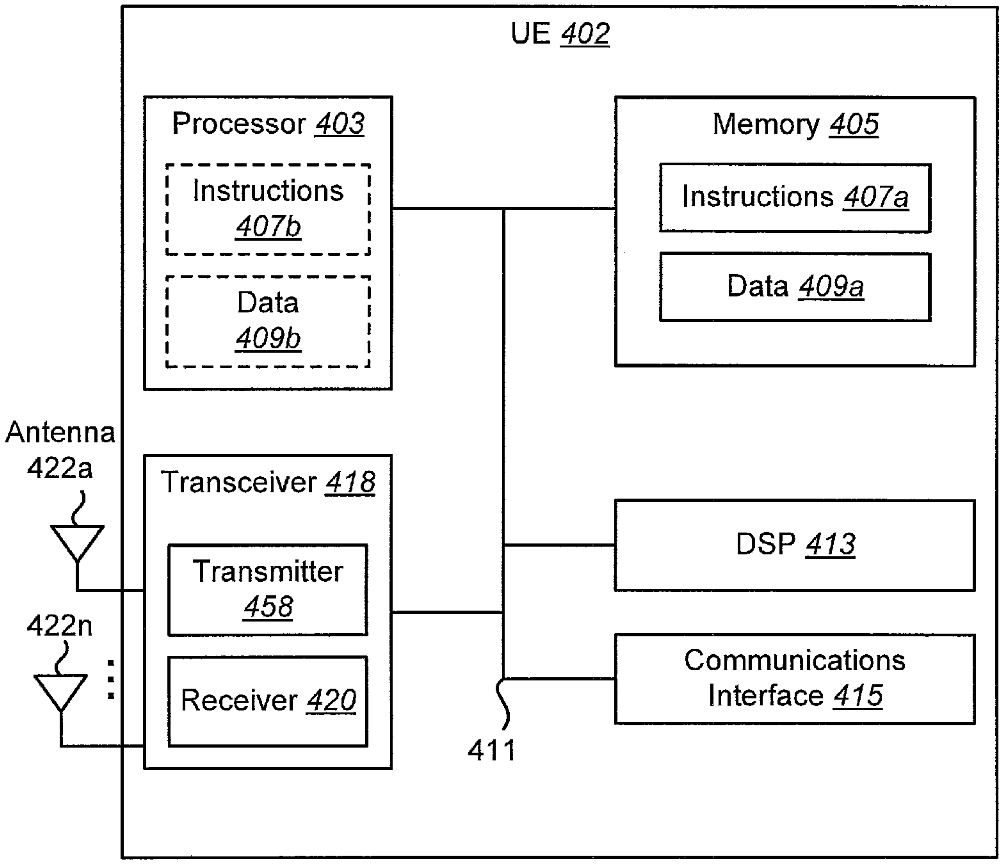
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. In some examples, the UE 402 may perform one or more of the methods, functions, operations, and/or examples, etc., described herein. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407*a* and data 409*a* to the processor 403. A portion of the memory 405 may also include non-volatile random-access memory (NVRAM). Instructions 407*b* and data 409*b* may also reside in the processor 403. Instructions 407*b* and/or data 409*b* loaded into the processor 403 may also include instructions 407*a* and/or data 409*a* from memory 405 that were loaded for execution or processing by the processor 403. The instructions 407*b* may be executed by the processor 403 to implement the methods described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422*a-n* are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
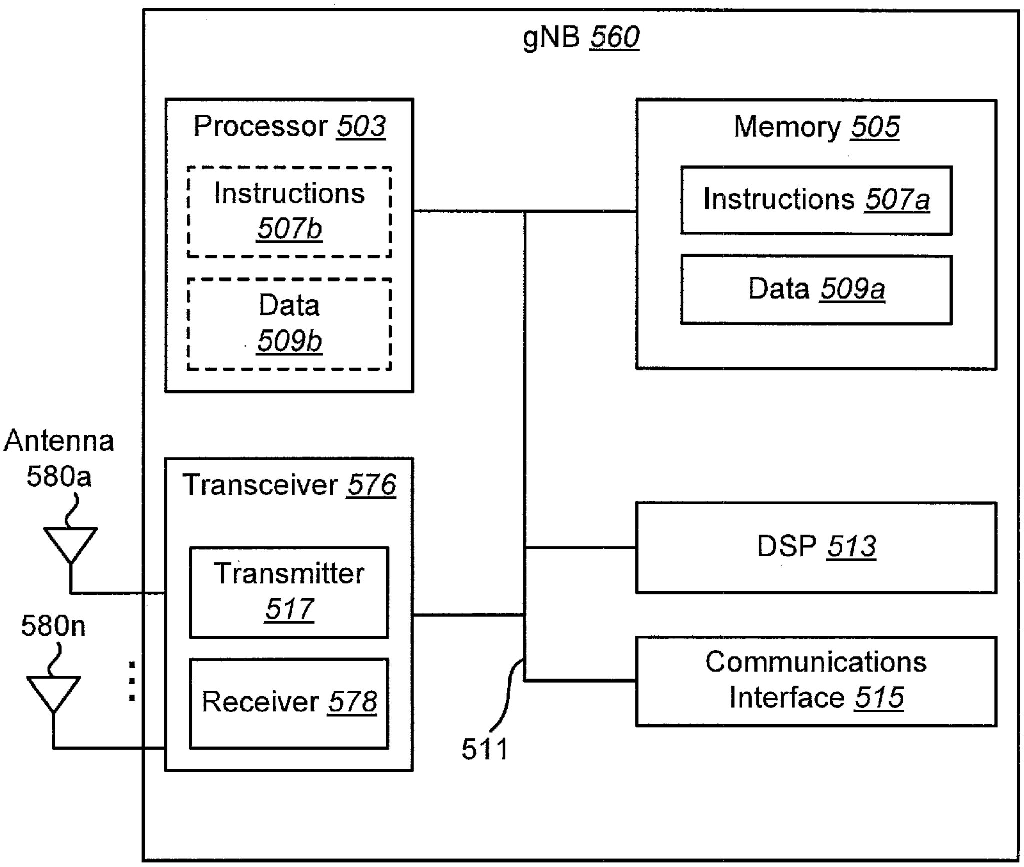
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. In some examples, the gNB 560 may perform one or more of the methods, functions, operations, and/or examples, etc., described herein. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507*a* and data 509*a* to the processor 503. A portion of the memory 505 may also include non-volatile random-access memory (NVRAM). Instructions 507*b* and data 509*b* may also reside in the processor 503. Instructions 507*b* and/or data 509*b* loaded into the processor 503 may also include instructions 507*a* and/or data 509*a* from memory 505 that were loaded for execution or processing by the processor 503. The instructions 507*b* may be executed by the processor 503 to implement the methods described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
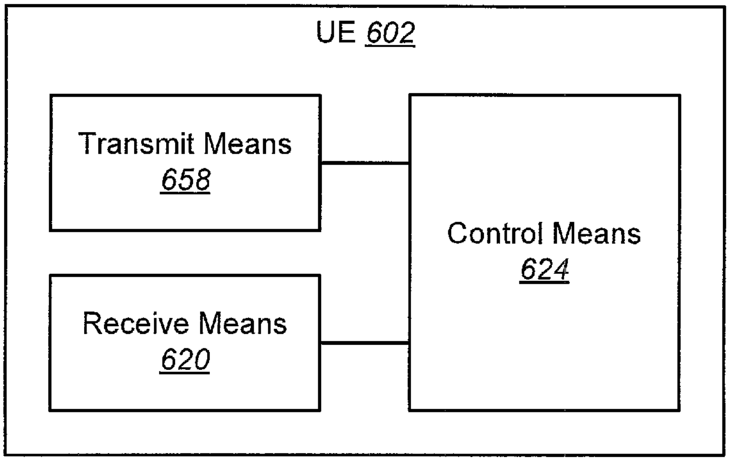
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
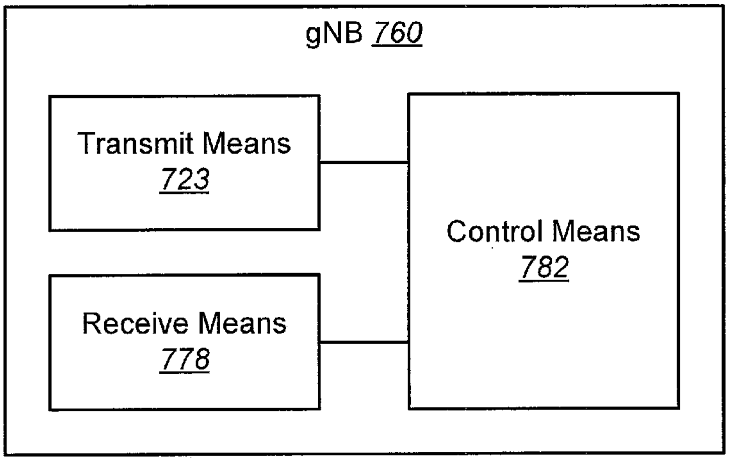
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

FIG. 8 is a flow diagram illustrating a method 800 by a UE for handling SR and PUSCH collision. For instance, FIG. 8 illustrates a problem that may occur with some approaches to handling SR and PUSCH collisions. The method 800 illustrates an example of SR and PUSCH collision handling when a PUCCH with a positive SR overlaps with a PUSCH. For example, a UE may determine 802 whether an SR and a PUSCH have the same priority. For instance, the UE may determine whether a priority index for the SR is the same as a priority index for the PUSCH.

In a case that the SR and the PUSCH have the same priority, the UE transmits 804 the PUSCH and does not transmit the PUCCH for the positive SR. Accordingly, the SR may be dropped. In this case, the base station may receive the PUSCH and does not receive the PUCCH for the positive SR.

In a case that the SR and PUSCH do not have the same priority, the UE may determine 806 whether the SR is configured with high priority. For instance, the UE may determine whether the priority index for the SR is 1 (indicating high priority, for instance). In a case that the SR is not configured with high priority, the UE may transmit 804 the PUSCH and may not transmit the PUCCH for the positive SR. In a case that the SR is configured with high priority, the UE transmits 808 the PUCCH for the positive HP SR and may cancel the transmission of the LP PUSCH. In this case, the base station may receive the PUCCH for the positive HP SR and does not receive the LP PUSCH.

As illustrated in FIG. 8, for overlapping between a PUCCH with a positive SR and a PUSCH with the same priority, the SR may be dropped and not reported. For overlapping between a PUCCH with a positive SR and a PUSCH with different priorities, the PUCCH or PUSCH with high priority or larger priority index may be transmitted, and the PUCCH or PUSCH with low priority or smaller priority index may be dropped.

Thus, for overlap between a PUCCH with a positive SR with low priority and a PUSCH with high priority, the PUCCH with low priority SR may be dropped and the high priority PUSCH may be transmitted. Similarly, for overlapping between a PUCCH with a positive SR with high priority and a PUSCH with low priority, the PUCCH with high priority SR has a higher priority and may be transmitted, and the PUSCH with low priority may be dropped. For example, if a UE 102 would transmit channels that would overlap in time between a first PUCCH of larger priority index with SR and a PUSCH of smaller priority index, the UE 102 is expected to cancel the PUSCH transmissions of smaller priority index before the first symbol overlapping with the PUCCH transmission of larger priority index.

In a case of PUSCH dropping by a HP PUCCH, the PUSCH transmission may be cancelled (e.g., cancelled at least) from the overlapping symbol with the HP PUCCH, and the PUSCH transmission may not be resumed after cancellation. If the transmission of the HP PUCCH is known before the starting symbol of the PUSCH, the PUSCH may be fully dropped without transmission.

FIG. 9 is a flow diagram illustrating another method 900 by a UE for handling SR and PUSCH collision. For instance, the method 900 may provide enhanced dropping behavior between SR and PUSCH. In some examples, the method 900 may be performed by the UE 102 described in relation to FIG. 1.

The method 900 illustrates an example of SR and PUSCH collision handling when a PUCCH with a positive HP SR overlaps with a LP PUSCH. For example, a UE may determine 902 whether UCI is multiplexed on the LP PUSCH. For instance, the UE may determine whether UCI (e.g., HARQ-ACK and/or SR) is multiplexed with other data on the LP PUSCH.

In a case that UCI is not multiplexed on the LP PUSCH, the UE transmits 904 the PUCCH for the positive HP SR and may cancel the transmission of the LP PUSCH. Accordingly, the LP PUSCH may be dropped. In this case, the base station may receive the PUCCH for the positive HP SR and may not receive the LP PUSCH.

In a case that UCI is multiplexed on the LP PUSCH, the UE may determine 906 whether at least a HP UCI is multiplexed on the LP PUSCH. For instance, the UE may determine whether the UCI that is multiplexed on the LP PUSCH includes a HP UCI (e.g., UCI with a priority index of 1). In a case that HP UCI is not multiplexed on the LP PUSCH, the UE may transmit 904 the PUCCH for the positive HP SR and may cancel the transmission of the LP PUSCH. In a case that at least a HP UCI is multiplexed on the LP PUSCH, the UE may transmit 908 the PUSCH with HP UCI, and may not transmit the PUCCH for the positive HP SR. In this case, the base station may receive the PUCCH with the HP UCI, and may not receive the PUCCH for the positive HP SR.

As illustrated in FIG. 9, in a case of a PUCCH where a positive HP SR overlaps with a LP PUSCH, if there is no UCI or only LP UCI is multiplexed on the PUSCH, previous dropping behavior may be used in some examples. Accordingly, the LP PUSCH may be dropped, and the HP SR PUCCH may be transmitted. In this case, the LP PUSCH may be a PUSCH with or without data, and with or without other UCIs such as a LP HARQ-ACK or a CSI, etc. If the LP PUSCH is dropped, the UCI multiplexed on the LP PUSCH (e.g., LP HARQ-ACK and/or CSI) may also be dropped and may not be received by the base station (e.g., gNB).

In case of a PUCCH where a positive HP SR overlaps with a LP PUSCH, and if there is at least a high priority UCI (e.g., a HP HARQ-ACK) multiplexed on the LP PUSCH, the LP PUSCH may be treated as a HP PUSCH. Accordingly, the HP SR may be dropped and the PUCCH for the positive SR with high priority may not be transmitted. The LP PUSCH may be transmitted. In some examples, the LP PUSCH may include other UCI besides the HP UCI (e.g., a LP HARQ-ACK and/or CSI).

In a case of PUSCH dropping, in some examples, the PUSCH transmission may be cancelled at least from the overlapping symbol with the HP PUCCH for the positive HP SR, and the PUSCH transmission may not be resumed after cancellation. If the positive HP SR status is known before the starting symbol of the PUSCH, the PUSCH may be fully dropped without transmission.

Some of the techniques for enhanced channel dropping may provide one or more benefits. For example, some of the techniques may provide to differentiate a LP PUSCH by the UCI multiplexed on the LP PUSCH. In some examples, some of the techniques may avoid dropping HP UCI multiplexed on a LP PUSCH.

FIG. 10 is a flow diagram illustrating a method 1000 by a UE for reporting both LP UCI on PUSCH and HP SR in overlapping conditions. In some examples, the method 1000 may be performed by the UE 102 (e.g., UE operations module 124, UE scheduling module 126, etc.) described in relation to FIG. 1. In some examples, the method 1000 may be performed if the LP UCI on PUSCH includes only a LP HARQ-ACK or only a CSI report.

The method 1000 illustrates an example where a PUCCH with a positive HP SR overlaps with a LP PUSCH multiplexed with LP UCI only. For example, a UE may determine 1002 whether a PUCCH for the positive HP SR overlaps with the PUSCH symbols carrying the LP UCI and/or the corresponding DMRS.

In a case that the PUCCH for the positive HP SR does not overlap with the PUSCH symbols carrying the LP UCI and/or the corresponding DMRS, the UE may transmit 1004 the PUCCH for the positive HP SR and may transmit a punctured PUSCH with all symbols carrying the LP UCI and the corresponding DMRS. In this case, the base station may receive the PUCCH for the positive HP SR and may receive a punctured PUSCH with all symbols carrying the LP UCI and the corresponding DMRS.

In a case that the PUCCH for the positive HP SR overlaps with the PUSCH symbols carrying the LP UCI and/or the corresponding DMRS, the UE may transmit 1006 the PUCCH for the positive HP SR and may cancel the transmission of the LP PUSCH.

As illustrated in FIG. 10, if the PUCCH for the positive HP SR does not overlap with the PUSCH symbols carrying the multiplexed LP UCI (e.g., LP HARQ-ACK information), and does not overlap with the corresponding DMRS for the UCI carrying symbols, the HP SR PUCCH may be transmitted, and the PUSCH with the LP UCI may be punctured (e.g., at least the overlapping symbols with the PUCCH for the HP SR). symbols carrying the LP UCI and the corresponding DMRS in the PUSCH may still be transmitted. In this case, both the LP UCI on PUSCH and the positive HP SR may be reported to the gNB 160.

Otherwise, if the PUCCH for the positive HP SR overlaps with the PUSCH symbols carrying the multiplexed LP UCI, (e.g., LP HARQ-ACK information) and/or overlaps with the corresponding DMRS for the UCI carrying symbols, the HP SR PUCCH may be transmitted, and the PUSCH with the LP UCI may be cancelled at least from the overlapping symbol. The PUSCH may not be resumed after it is cancelled.

FIG. 11 is a flow diagram illustrating a method 1100 by a UE for reporting multiple LP UCIs on PUSCH and HP SR by overlapping conditions. In some examples, the method 1100 may be performed by the UE 102 described in relation to FIG. 1.

The method 1100 illustrates an example of SR and PUSCH collision handling when a PUCCH with a positive HP SR overlaps with a LP PUSCH multiplexed with LP UCI only, including both LP HARQ-ACK and CSI. For example, a UE may determine 1102 whether a PUCCH for the positive HP SR overlaps with the PUSCH symbols carrying the LP UCIs and/or the corresponding DMRS.

In a case that the PUCCH for the positive HP SR does not overlap with the PUSCH symbols carrying the LP UCIs and/or the corresponding DMRS, the UE may transmit 1104 the PUCCH for the positive HP SR and may transmit a punctured PUSCH with all symbols carrying the LP UCIs and the corresponding DMRS. In this case, the base station may receive the PUCCH for the positive HP SR and may receive the punctured PUSCH with all symbols carrying the LP UCIs and the corresponding DMRS.

In a case that the PUCCH for the positive HP SR overlaps with the PUSCH symbols carrying the LP UCIs and/or the corresponding DMRS, the UE may determine 1106 whether the PUCCH for the positive HP SR overlaps with the PUSCH symbols carrying the LP HARQ-ACK and/or the corresponding DMRS. In a case that the PUCCH for the positive HP SR does not overlap with the PUSCH symbols carrying the LP HARQ-ACK and/or the corresponding DMRS, the UE may transmit 1108 the PUCCH for the positive HP SR and may transmit a punctured PUSCH with all symbols carrying the LP HARQ-ACK and the corresponding DMRS. In a case that the PUCCH for the positive HP SR overlaps with the PUSCH symbols carrying the LP HARQ-ACK and/or the corresponding DMRS, the UE may transmit 1110 the PUCCH for the positive HP SR and may cancel the transmission of the LP PUSCH. In this case, the base station may receive the PUCCH for the positive HP SR and may not receive the LP PUSCH.

As illustrated in FIG. 11, if the PUCCH for the positive HP SR does not overlap with the PUSCH symbols carrying the multiplexed LP UCIs including HARQ-ACK and CSI, and does not overlap with the corresponding DMRS for the UCI carrying symbols, the HP SR PUCCH is transmitted, and the PUSCH with the LP UCI is punctured for at least the overlapping symbols with the PUCCH for the HP SR. In this approach, all symbols carrying the LP UCIs and the corresponding DMRSs in the PUSCH may still be transmitted. In this approach, both the LP UCIs (including LP HARQ-ACK and CSI) on the PUSCH and the positive HP SR may be reported to the gNB (e.g., gNB 160).

If the PUCCH for the positive HP SR overlaps with the PUSCH symbols carrying the multiplexed LP UCIs including HARQ-ACK and CSI and/or overlaps with the corresponding DMRS for the UCI carrying symbols, the overlapping conditions may be further evaluated based on the symbol carrying LP HARQ-ACK information only.

If the PUCCH for the positive HP SR does not overlap with the PUSCH symbols carrying the multiplexed LP HARQ-ACK information, and does not overlap with the corresponding DMRS for the UCI carrying symbols, the HP SR PUCCH is transmitted, and the PUSCH with the LP UCIs is punctured on at least the overlapping symbols with the PUCCH for the HP SR. All symbols carrying the LP HARQ-ACK and the corresponding DMRS in the PUSCH may still be transmitted. In this case, both the LP HARQ-ACK on PUSCH and the positive HP SR may be reported to the gNB (e.g., gNB 160).

If the PUCCH for the positive HP SR overlaps with the PUSCH symbols carrying the multiplexed LP HARQ-ACK and/or overlaps with the corresponding DMRS for the LP HARQ-ACK carrying symbols, the HP SR PUCCH may be transmitted, and the PUSCH with the LP UCIs may be cancelled at least from the overlapping symbol. The PUSCH may not be resumed after it is cancelled.

Figure 12:
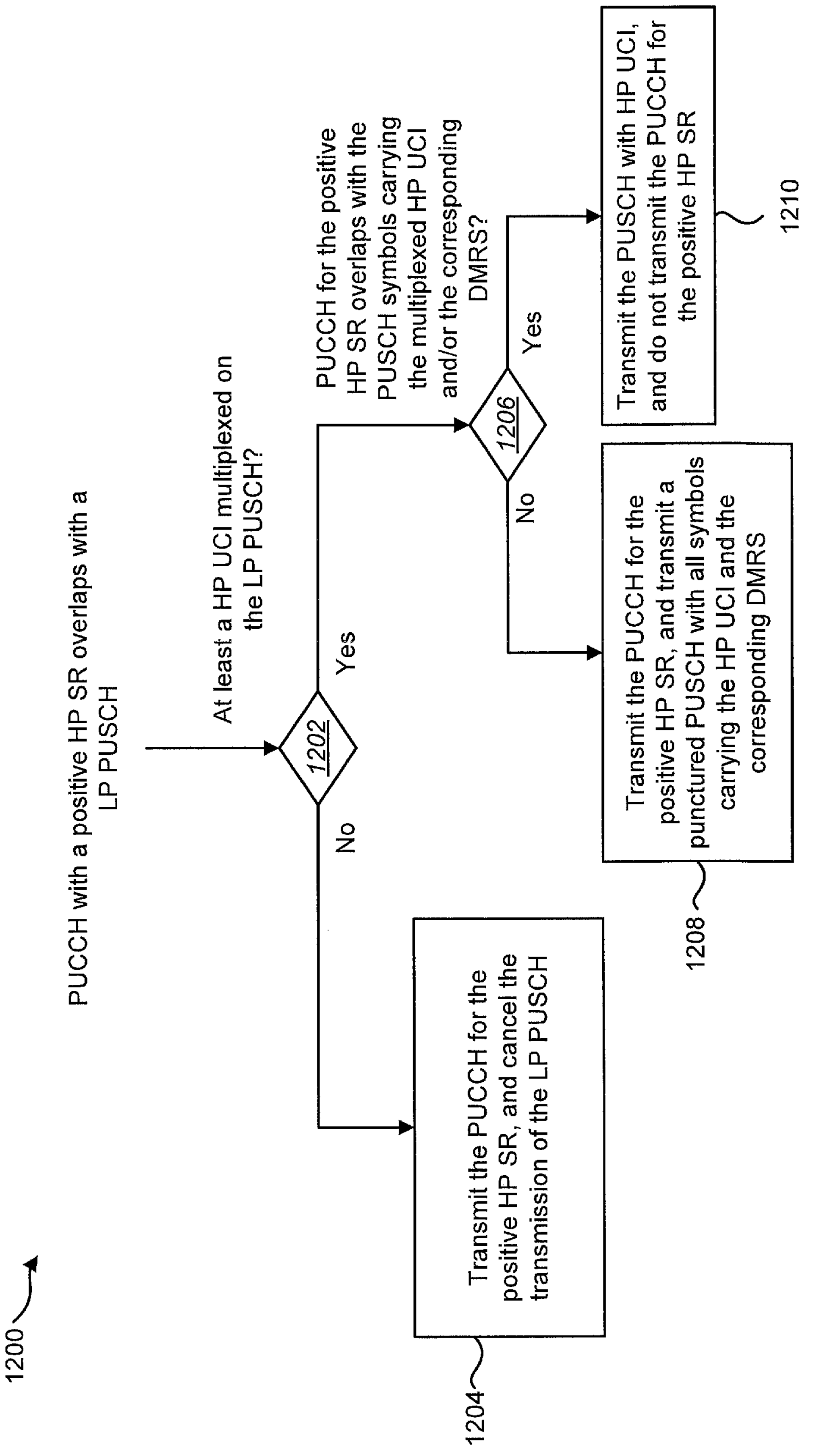
FIG. 12 is a flow diagram illustrating a method by a UE for reporting both HP UCI on a PUSCH and HP SR by overlapping conditions.

FIG. 12 is a flow diagram illustrating a method 1200 by a UE for reporting both HP UCI on a PUSCH and HP SR by overlapping conditions. In some examples, the method 1200 may be performed by the UE 102 (e.g., UE operations module 124, UE scheduling module 126, etc.) described in relation to FIG. 1.

The method 1200 illustrates an example of SR and PUSCH collision handling when a PUCCH with a positive HP SR overlaps with a LP PUSCH. For example, a UE may determine 1202 whether at least a HP UCI is multiplexed on the LP PUSCH. In a case that at least a HP UCI is not multiplexed on the LP PUSCH, the UE may transmit 1204 the PUCCH for the positive HP SR and may cancel the transmission of the LP PUSCH.

In a case that at least a HP UCI is multiplexed on the LP PUSCH, the UE may determine 1206 whether the PUCCH for the positive HP SR overlaps with the PUSCH symbols carrying the multiplexed HP UCI and/or the corresponding DMRS. In a case that the PUCCH for the positive HP SR does not overlap with the PUSCH symbols carrying the multiplexed HP UCI and/or the corresponding DMRS, the UE may transmit 1208 the PUCCH for the positive HP SR and may transmit a punctured PUSCH with all symbols carrying the HP UCI and the corresponding DMRS. In this case, the base station may receive the PUCCH, and may receive the punctured PUSCH. In a case that the PUCCH for the positive HP SR overlaps with the PUSCH symbols carrying the multiplexed HP UCI and/or the corresponding DMRS, the UE may transmit 1210 the PUSCH with HP UCI, and may not transmit the PUCCH for the positive HP SR. In this case, the base station may receive the PUSCH with HP UCI, and may not receive the PUCCH for the positive HP SR.

In some examples, if the PUCCH for the positive HP SR does not overlap with the PUSCH symbols carrying the multiplexed HP UCI (e.g., HP HARQ-ACK) and/or the corresponding DMRS, the HP SR PUCCH is transmitted, and the PUSCH with the HP UCI is punctured for at least the overlapping symbols with the PUCCH for the HP SR. All symbols carrying the HP UCI and the corresponding DMRS in the PUSCH may be transmitted. In this approach, both the HP UCI on PUSCH and the positive HP SR may be reported to the gNB (e.g., gNB 160).

Otherwise, if the PUCCH for the positive HP SR overlaps with the PUSCH symbols carrying the multiplexed HP UCI (e.g., HP HARQ-ACK information) and/or overlaps with the corresponding DMRS for the UCI carrying symbols, the HP SR may be dropped, and the PUSCH with the HP UCI is transmitted.

Figure 13:
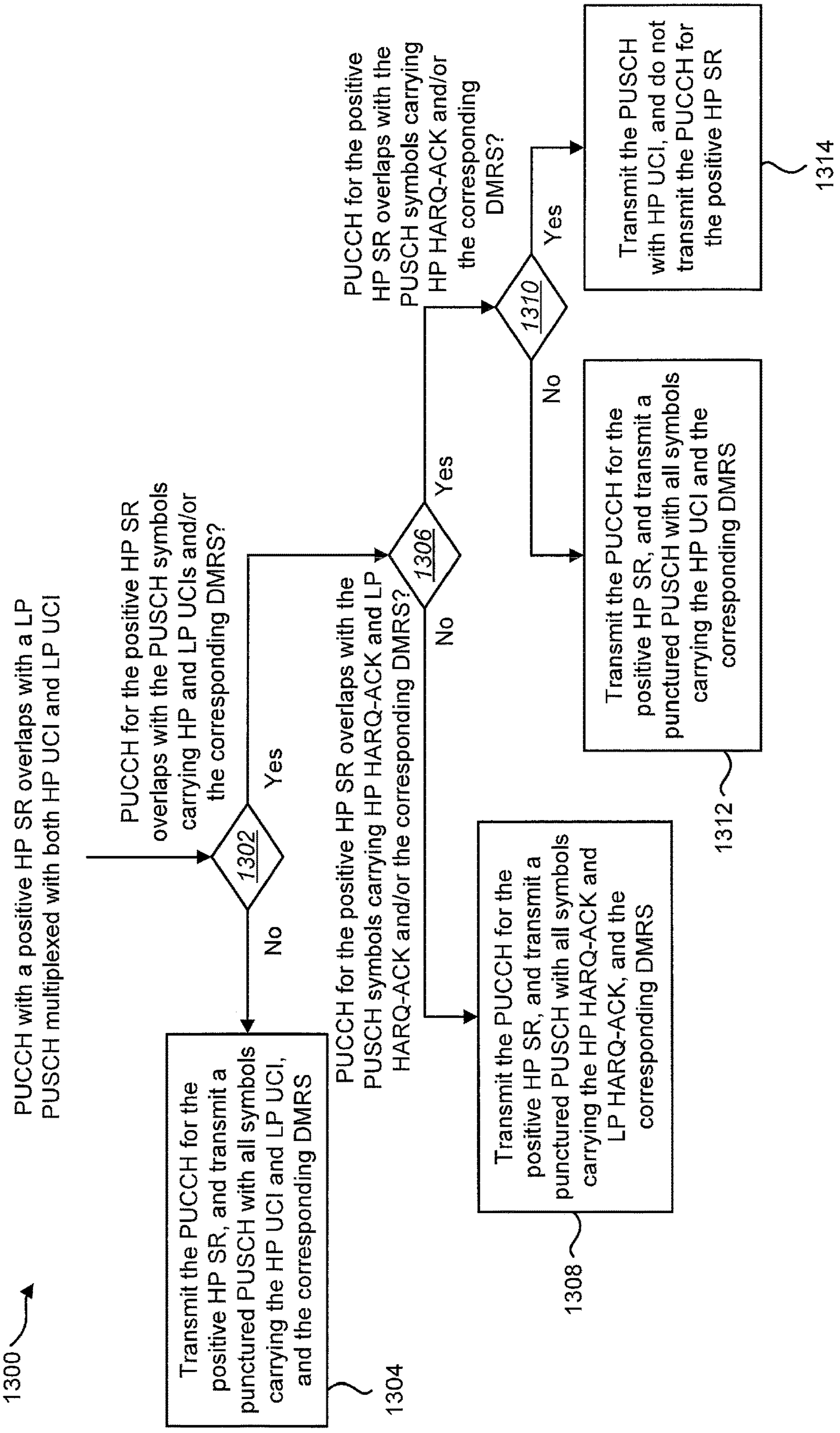
FIG. 13 is a flow diagram illustrating a method by a UE for reporting both HP and LP UCI on a PUSCH and HP SR by overlapping conditions.

FIG. 13 is a flow diagram illustrating a method 1300 by a UE for reporting both HP and LP UCI on a PUSCH and HP SR by overlapping conditions. In some examples, the method 1300 may be performed by the UE 102 (e.g., UE operations module 124, UE scheduling module 126, etc.) described in relation to FIG. 1.

The method 1300 illustrates an example of SR and PUSCH collision handling when a LP PUSCH multiplexed with both HP UCI and LP UCI. For example, a UE may determine 1302 whether a PUCCH for the positive HP SR overlaps with the PUSCH symbols carrying HP and LP UCIs and/or the corresponding DMRS. In a case that the PUCCH for the positive HP SR does not overlap with the PUSCH symbols carrying HP and LP UCIs and/or the corresponding DMRS, the UE may transmit 1304 the PUCCH for the positive HP SR and may transmit a punctured PUSCH with all symbols carrying the HP UCI and LP UCI, and the corresponding DMRS.

In a case that the PUCCH for the positive HP SR overlaps with the PUSCH symbols carrying HP and LP UCIs and/or the corresponding DMRS, the UE may determine 1306 whether the PUCCH for the positive HP SR overlaps with the PUSCH symbols carrying HP HARQ-ACK and LP HARQ-ACK and/or the corresponding DMRS. In a case that the PUCCH for the positive HP SR does not overlap with the PUSCH symbols carrying HP HARQ-ACK and LP HARQ-ACK and/or the corresponding DMRS, the UE may transmit 1308 the PUCCH for the positive HP SR and may transmit a punctured PUSCH with all symbols carrying the HP HARQ-ACK and LP HARQ-ACK, and the corresponding DMRS. In this case, the base station (e.g., gNB 160) may receive the PUCCH, and may receive the punctured PUSCH. In a case that the PUCCH for the positive HP SR overlaps with the PUSCH symbols carrying HP HARQ-ACK and LP HARQ-ACK and/or the corresponding DMRS, the UE may determine 1310 whether the PUCCH for the positive HP SR overlaps with the PUSCH symbols carrying HP HARQ-ACK and/or the corresponding DMRS.

In a case that the PUCCH for the positive HP SR does not overlap with the PUSCH symbols carrying HP HARQ-ACK and/or the corresponding DMRS, the UE may transmit 1312 the PUCCH for the positive HP SR and may transmit a punctured PUSCH with all symbols carrying the HP UCI and the corresponding DMRS. In a case that the PUCCH for the positive HP SR overlaps with the PUSCH symbols carrying HP HARQ-ACK and/or the corresponding DMRS, the UE may transmit 1314 the PUSCH with HP UCI, and may not transmit the PUCCH for the positive HP SR. In this case, the base station may receive the PUSCH with HP UCI, and may not receive the PUCCH for the positive HP SR.

In some examples, if the PUCCH for the positive HP SR does not overlap with the PUSCH symbols carrying the multiplexed HP and LP UCIs, the HP SR PUCCH may be transmitted, and the PUSCH may be punctured for at least the overlapping symbols with the PUCCH for the HP SR. All symbols carrying the HP and LP UCIs and the corresponding DMRSs in the PUSCH may be transmitted. In this case, both the HP and LP UCIs (including HP HARQ-ACK and LP HARQ-ACK, and CSI if present, for instance) on the PUSCH and the positive HP SR may be reported to the gNB (e.g., gNB 160). If the PUCCH for the positive HP SR overlaps with the PUSCH symbols carrying the multiplexed HP and LP UCIs and/or overlaps with the corresponding DMRS for the UCI carrying symbols, and if the CSI is included in the UCI, the overlapping conditions may be further evaluated based on the symbol carrying HARQ-ACK only, including both HP HARQ-ACK and LP HARQ-ACK.

If the PUCCH for the positive HP SR does not overlap with the PUSCH symbols carrying the multiplexed HP HARQ-ACK and LP HARQ-ACK, the HP SR PUCCH may be transmitted, and the PUSCH may be punctured for at least the overlapping symbols with the PUCCH for the HP SR. All symbols carrying the HP HARQ-ACK and LP HARQ-ACK and the corresponding DMRSs in the PUSCH may be transmitted. In this case, both the HP HARQ-ACK and LP HARQ-ACK on PUSCH and the positive HP SR may be reported to the gNB (e.g., gNB 160).

If the PUCCH for the positive HP SR overlaps with the PUSCH symbols carrying the multiplexed HP HARQ-ACK and LP HARQ-ACK, and/or overlaps with the corresponding DMRS for the HARQ-ACK carrying symbols, the overlapping conditions may be further evaluated based on the symbol carrying HP UCI (e.g., HP HARQ-ACK information only).

If the PUCCH for the positive HP SR does not overlap with the PUSCH symbols carrying the multiplexed HP HARQ-ACK information, the HP SR PUCCH may be transmitted, and the PUSCH may be punctured for at least the overlapping symbols with the PUCCH for the HP SR. All symbols carrying the HP HARQ-ACK and the corresponding DMRS in the PUSCH may be transmitted. In this case, both the HP HARQ-ACK on PUSCH and the positive HP SR may be reported to the gNB (e.g., gNB 160).

If the PUCCH for the positive HP SR overlaps with the PUSCH symbols carrying the multiplexed HP HARQ-ACK and/or overlaps with the corresponding DMRS, the HP SR may be dropped, and the PUSCH with all multiplexed UCIs may be transmitted.

FIG. 14A is a diagram illustrating a first example of puncturing in accordance with some of the techniques described herein. In some examples, only the overlapping symbols between the LP PUSCH and the PUCCH for HP SR may be punctured. Thus, if there are remaining symbols after the overlapping region, the PUSCH transmission may be resumed, as illustrated in FIG. 14A.

FIG. 14B is a diagram illustrating a second example of puncturing in accordance with some of the techniques described herein. In this example, the PUSCH transmission may be resumed if the LP UCI is multiplexed in two hops in case of frequency hopping is configured, and the overlapping symbols are between the LP UCI carrying symbols, as shown in FIG. 14B. In some examples, the HP UCI may be multiplexed on one hop only on PUSCH.

FIG. 14C is a diagram illustrating a third example of puncturing in accordance with some of the techniques described herein. For instance, the puncturing is performed from the first overlapping symbol between the LP PUSCH and the PUCCH for HP SR, and the LP PUSCH transmission may not be resumed, as shown in FIG. 14C. Thus, there may be remaining symbols after the overlapping region but no remaining symbol carrying the UCI. With this approach, if frequency hopping is configured, and the UCI is multiplexed in both hops, all symbols between the two segments of UCI symbols may be treated as UCI carrying symbols for overlapping evaluation.

FIG. 14D is a diagram illustrating a fourth example of puncturing in accordance with some of the techniques described herein. For instance, the puncturing may happen immediately after the last PUSCH symbol carrying the multiplexed UCI (e.g., the HARQ-ACK), as shown in FIG. 14D.

FIG. 14E is a diagram illustrating a fifth example of puncturing in accordance with some of the techniques described herein. For instance, the PUSCH may be punctured by keeping only the DMRS symbols and the symbols with multiplexed UCI (e.g., the HARQ-ACK), as shown in FIG. 14E. FIGS. 14A-D may provide examples of PUSCH dropping approaches by PUCCH with positive HP SR.

Some examples of the techniques described herein may provide benefits of dropping methods with potential simultaneous SR PUCCH and UCI reporting on PUSCH. In some examples, it may be beneficial to report both a HP positive SR and the UCI multiplexed on a LP PUSCH, the UCI on PUSCH may be HP HARQ-ACK and/or LP HARQ-ACK and/or CSI. In some examples, in case of multiple UCIs multiplexed on a LP PUSCH, iterative steps may be used to report as many UCIs as possible.

The present disclosure describes signaling and support of SR multiplexing on PUSCH, which provides the necessity and benefits to support SR multiplexing on PUSCH. The support of SR multiplexing on PUSCH may need different methods for different scenarios. Thus, the signaling of support of SR multiplexing on PUSCH for different scenarios may be configured separately or together based on higher layering and/or UE capabilities, etc. Furthermore, even if SR multiplexing on PUSCH is configured, the UE may perform SR multiplexing on PUSCH or channel dropping depending on the timing of SR status and the delay tolerance of HP SR.

The present disclosure also describes high priority SR multiplexing methods on a low priority PUSCH and provides detailed methods to multiplex HP SR on LP PUSCH. In one method, separate dedicated reserved resources can be used for SR multiplexing on PUSCH. This requires additional coding chains. If negative SR is not multiplexed on PUSCH, gNB needs to perform SR detection first to determine the UCI and data rate matching locations accordingly. In another method, the SR may be reported together with HARQ-ACK if present, or using the HARQ-ACK resources if no HARQ-ACK is present. In one approach, a single SR bit may be used for multiplexing on PUSCH. In another approach, a number of SR bits may be generated based on the overlapping conditions between the SR PUCCH resources and the PUSCH to indicate the index of a positive SR.

Signaling and Configurations of SR Multiplexing on PUSCH In current NR operations, SR multiplexing on a PUSCH is not supported, as described above. For overlapping between a PUCCH with a positive SR and a PUSCH with the same priority, the SR is dropped and not reported. When the PUSCH has the same priority as SR, dropping the SR is reasonable especially if there is only one SR configured. Because a PUSCH is under transmission already, there is so no need to send another scheduling request.

However, in NR, multiple SRs can be configured for different services or traffics. Thus, report a SR for a separate traffic or a separate service or a different SR triggering condition may be beneficial even if there is an ongoing traffic for a traffic or a service with the same priority.

Also in current NR, for overlapping between a PUCCH with a positive SR a PUSCH with different priorities, the PUCCH or PUSCH with high priority or larger priority index is transmitted, and the PUCCH or PUSCH with low priority or smaller priority index is dropped. Thus, for overlapping between a PUCCH with a positive SR with high priority and a PUSCH with low priority, the PUCCH with high priority SR is with high priority and will be transmitted, and the PUSCH with low priority is dropped. That is, if a UE would transmit the following channels that would overlap in time between a first PUCCH of larger priority index with SR and a PUSCH of smaller priority index, the UE is expected to cancel the PUSCH transmissions of smaller priority index before the first symbol overlapping with the PUCCH transmission of larger priority index.

The behavior ensures the high priority SR is reported with the tradeoff of dropped LP PUSCH transmission. Since a SR only carries one (1) bit information, the overhead of dropping a PUSCH is considerable. Furthermore, since the high priority HARQ-ACK multiplexing on a LP PUSCH is supported, it is naturally to extend the support of high priority SR on a LP PUSCH.

Similarly, for overlapping between a PUCCH with a positive SR with low priority and a PUSCH with high priority, the PUCCH with low priority SR is dropped and the high priority PUSCH is transmitted. Again, since the low priority HARQ-ACK multiplexing on a HP PUSCH is also supported, it is better to extend the support of low priority SR on a HP PUSCH.

Therefore, as an alternative to channel dropping, SR multiplexing on PUSCH can be supported as a UCI multiplexing enhancement. The SR multiplexing on PUSCH may be supported as a separate feature. The SR multiplexing on PUSCH can be defined as a UE capability. A UE can be configured for SR multiplexing on PUSCH if the UE is capable of supporting it.

The following cases may be considered for SR multiplexing on PUSCH.

Case 1: A HP SR reporting on a LP PUSCH

Case 2: A LP SR reporting on a HP PUSCH

Case 3: A HP SR reporting on a HP PUSCH

Case 4: A LP SR reporting on a LP PUSCH

In the first two cases, a SR may be multiplexed on a PUSCH with a different priority. In the last two cases, a SR may be multiplexed on a PUSCH with the same priority. Among all these cases, Case 1 is the most important use case as described before. There are some benefits of HP SR multiplexing on a LP PUSCH, including (a) avoid dropping of HP and/or LP UCI multiplexed on a LP PUSCH, and (b) avoid dropping the LP PUSCH data.

The other cases are also beneficial, especially if the UE can report which SR is triggered if there are multiple overlapping SR PUCCH resources with the PUSCH. The extra information on the SR indication can provide more accurate feedback to the gNB.

SR Multiplexing on PUSCH Signaling and Configurations A new RRC parameter may be specified to support SR reporting on PUSCH, e.g. SRonPUSCH, SRonPUSCH-r17, SRmultiplexingonPUSCH, SRmultiplexingonPUSCH-r17, etc.

In one approach, the SR reporting on PUSCH may be limited to high priority SR on LP PUSCH only by the new radio resource control (RRC) parameter. A RRC parameter can be used to enable the cases with a Boolean value, i.e. enabled or 1, and not enabled or 0. For example:

(a) If the parameter for SR multiplexing on PUSCH is configured and is enabled, HP SR multiplexing on LP PUSCH is supported. The detailed methods of SR multiplexing on PUSCH will be presented in later sections.

(b) If the parameter for SR multiplexing on PUSCH is not configured and is not enabled, the UE may apply an enhanced channel dropping method as provided in the previous sections.

In another approach, the SR reporting on PUSCH may be limited to the cases where SR and PUSCH with different priorities. A RRC parameter can be used to enable the cases with a Boolean value, i.e. enabled or 1, and not enabled or 0. The RRC parameter may be a different parameter, e.g. SRonPUSCH_differentPriority, SRmultiplexingonPUSCH SRonPUSCH_differentPriority, etc. For example:

(a) If the parameter for SR multiplexing on PUSCH is configured and is enabled, the UE will allow HP SR on LP PUSCH and LP SR on HP PUSCH.

(b) If the parameter for SR multiplexing on PUSCH is not configured and is not enabled, the UE may apply an enhanced channel dropping method for overlapping between HP positive SR and a LP PUSCH, and drop the LP positive SR PUCCH for overlapping between HP PUSCH and a LP positive SR.

Yet in another approach, all cases of SR reporting on PUSCH may be supported. A single RRC parameter can be used to enable all cases with a Boolean value, i.e. enabled or 1, and not enabled or 0.

Alternatively, or additionally, several entries or values may be configured for the RRC parameter to indicate the cases that are supported. For example, two bits can be used, and 00 indicates SR multiplexing is not enabled, 01 indicates that HP SR on LP PUSCH is supported, 10 indicates SR multiplexing on PUSCH with different priority is supported, and 11 indicates all cases are supported. The entries or the corresponding supported cases may be determined or modified by RRC configured.

Alternatively, or additionally, different RRC parameters can be used to enable different cases. For instance, one parameter is used to indicate support of SR multiplexing on a PUSCH with a different priority, e.g. SRonPUSCH_differentPriority, SRmultiplexingonPUSCH_differentPriority, etc; and another parameter is used to indicate support of SR multiplexing on a PUSCH with the priority, e.g. SRonPUSCH_sametPriority, SRmultiplexingonPUSCH samePriority, etc. For example:

(a) If SR multiplexing on PUSCH is configured and is enabled for a case, the UE will perform positive SR multiplexing on PUSCH for the given case.

(b) If SR multiplexing on PUSCH is not configured or is not enabled for a case, the UE will perform channel dropping based on existing methods. Alternatively, or additionally, for overlapping between HP positive SR and a LP PUSCH, an enhanced channel dropping method as given above can be used.

If all cases are supported, or if both SR with the same priority and SR with a different priority can be multiplexed on a PUSCH, the priority of the SR should be indicated in the report.

In the following, the SR multiplexing on PUSCH considerations and methods are illustrated with the case of HP SR multiplexing on LP PUSCH.

SR Multiplexing Timing Considerations

Figure 15:
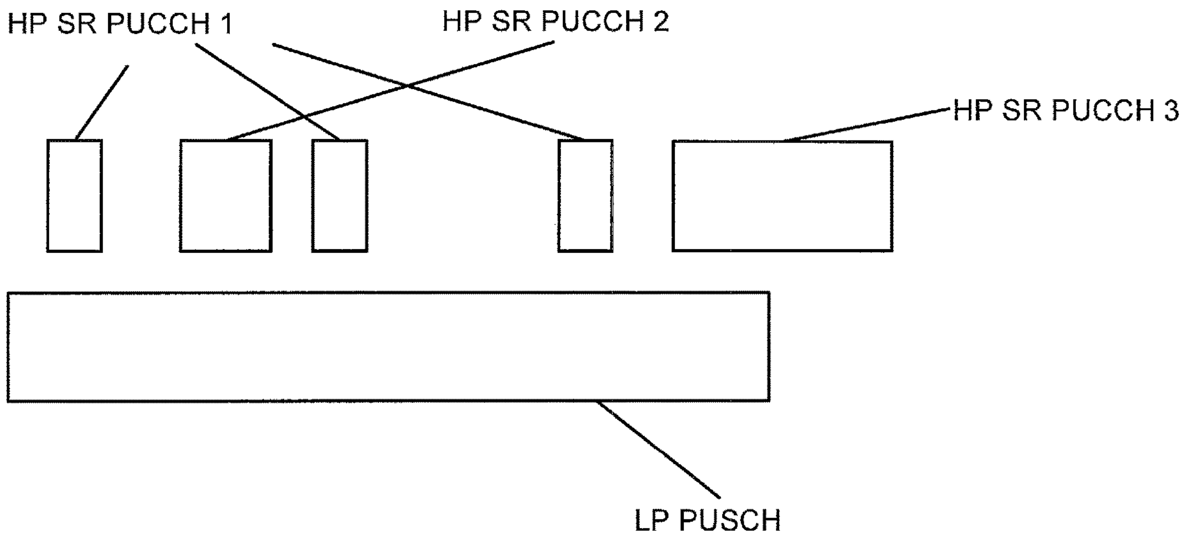
FIG. 15 is a diagram illustrating examples of HP SR PUCCH and LP PUSCH overlapping scenarios.

The SR timing should be considered as well. FIG. 15 is a diagram illustrating examples of HP SR PUCCH and LP PUSCH overlapping scenarios. Normally, it is not a problem for cases where PUSCH and SR with the same priority, and for the case of a LP SR multiplexing on a HP PUSCH. For these cases, the SR status for all overlapping SR PUCCH resources can be assumed known before the PUSCH transmission.

However, for HP SR multiplexing on a LP PUSCH, there are several potential issues. As illustrated in FIG. 15, there may be multiple overlapping HP SR PUCCH resources with a LP PUSCH. A SR PUCCH may be fully overlapping (e.g. SR PUCCH 2 in FIG. 15) or partial overlapping (e.g. SR PUCCH 3 in FIG. 15) with the PUSCH. A SR PUCCH may be configured with very short periodicity such that there are multiple instances overlaps with the PUSCH, as shown in HP SR PUCCH 1 in FIG. 15.

Thus, the status of a HP SR known before the PUSCH transmission may be changed after the PUSCH transmission starts. If a positive HP SR may arrive after the PUSCH transmission is started, there is no time to process the SR multiplexing on PUSCH. Furthermore, the HP SR may be delay sensitive, depending on the multiplexing location of the SR, the delay requirement may not be satisfied if the SR is multiplexed on the PUSCH.

Moreover, if SR multiplexing is supported, some processing time is needed to perform SR multiplexing on PUSCH. This includes the SR signal generation on the multiplexing resources, the rate matching of other UCI and or data on the PUSCH. The processing time d may be pre-defined or configured. The time d can be defined as a number of symbols, e.g. 0, 1, 2 symbols. The processing time may be determined by a reported UE capability.

Therefore, the UE requires a minimum of d symbols before the LP PUSCH transmission to multiplex SR on the PUSCH when applicable. Thus, if a positive HP SR arrives earlier than d symbols before the LP PUSCH transmission, the UE can perform SR multiplexing on PUSCH. Otherwise, if a positive HP SR may arrive less than d symbols before the PUSCH transmission is started, the UE has no time to process new positive SR multiplexing on PUSCH.

Furthermore, the HP SR may be delay sensitive, depending on the multiplexing location of the SR, the delay requirement for a SR report may not be satisfied if the SR is multiplexed on the PUSCH. Especially for a SR configuration with very short periodicity and if the SR is multiplexed on PUSCH in two hops when frequency hopping is configured.

With SR timing considerations, for the following case, the channel dropping should be used even if SR multiplexing on PUSCH is configured, and even if the SR is already multiplexed on PUSCH with the SR status before the LP PUSCH transmission.

Case 1: if all HP SRs are negative before the LP PUSCH transmission, and a positive HP SR comes after the start of a LP PUSCH transmission or within the d symbol SR processing time before the start of the LP PUSCH transmission. In this case, if SR multiplexing on PUSCH is configured, since all HP SRs are negative before the LP PUSCH transmission, a negative SR may or may not be multiplexed on the LP PUSCH depending on the SR multiplexing methods. Since the positive HP SR arrives after the start of LP PUSCH transmission or within the d symbol SR processing time before the start of the LP PUSCH transmission, there is no time to change the SR status for SR multiplexing and to perform additional UCI rate matching etc.

Case 2: the HP SR multiplexing on a LP PUSCH cannot satisfy the delay requirements for the given positive HP SR.

The SR delay requirements may be estimated by the periodicity of SR PUCCH configuration, i.e. the maximum delay of a HP SR should be the same as the periodicity of the SR PUCCH. As illustrated in FIG. 15, HP SR PUCCH 1, if there is a HP SR triggered in the first instance of the HP SR PUCCH 1, but some SR multiplexing symbols on PUSCH are later than the next instance of the HP SR PUCCH 1, the delay requirement cannot be satisfied.

In another case, if there is a positive HP SR known with sufficient process time before the LP PUSCH transmission, and the positive HP SR is multiplexed on the LP PUSCH. If there is a new positive HP SR triggered on an overlapping HP PUCCH resource after the start of LP PUSCH transmission with positive SR multiplexed, the UE transmits the LP PUSCH with the multiplexed positive SR is transmitted, and does not transmit the PUCCH for the newly trigger positive HP SR. For example in FIG. 15, if a positive HP SR is known for HP SR PUCCH 2 before the LP PUSCH transmission, the HP SR is already multiplexed on the LP PUSCH. If a positive SR is triggered later on HP SR PUCCH 4, the later SR PUCCH should be dropped.

Considerations of SR Multiplexing and UE/gNB Behaviors

For a UCI, like a HARQ-ACK or a CSI, the gNB knows whether the UCI is present in the PUSCH or not based on the multiplexing rules, However, for a SR, the gNB knows the SR configurations, and the overlapping conditions between SR PUCCH and the PUSCH, however, the gNB does not know whether a positive SR will be triggered or not. Therefore, at least two methods can be considered for SR multiplexing on PUSCH.

In one method, if a case of HP SR multiplexing on LP PUSCH is configured, if there is at least an overlapping HP SR PUCCH resource with the LP PUSCH, HP SR multiplexing on LP PUSCH is performed regardless of SR statue. That is, if there is a positive HP SR, the positive HP SR is multiplexed and reported on the LP PUSCH. If there is no positive HP SR, a negative HP SR is multiplexed and reported on the LP PUSCH. With this method, the UE and gNB follows a unified methods for SR multiplexing.

In another method, if a case of HP SR multiplexing on LP PUSCH is configured, if there is at least an overlapping HP SR PUCCH resource with the LP PUSCH, HP SR multiplexing on LP PUSCH is performed only when there is a positive HP SR. Thus, positive HP SR is multiplexed and reported on the LP PUSCH. If there is no positive HP SR, HP SR multiplexing on LP PUSCH is not performed. Thus, the UE performs different behaviors for positive SR and negative SR. Consequently, the gNB may perform SR detection first to determine the multiplexing behavior of other data or UCL on the LP PUSCH. That is, the gNB may detect the SR, and then assume different behaviors with or without a SR multiplexing for PUSCH reception. This will introduce extra complexity.

Figure 16:
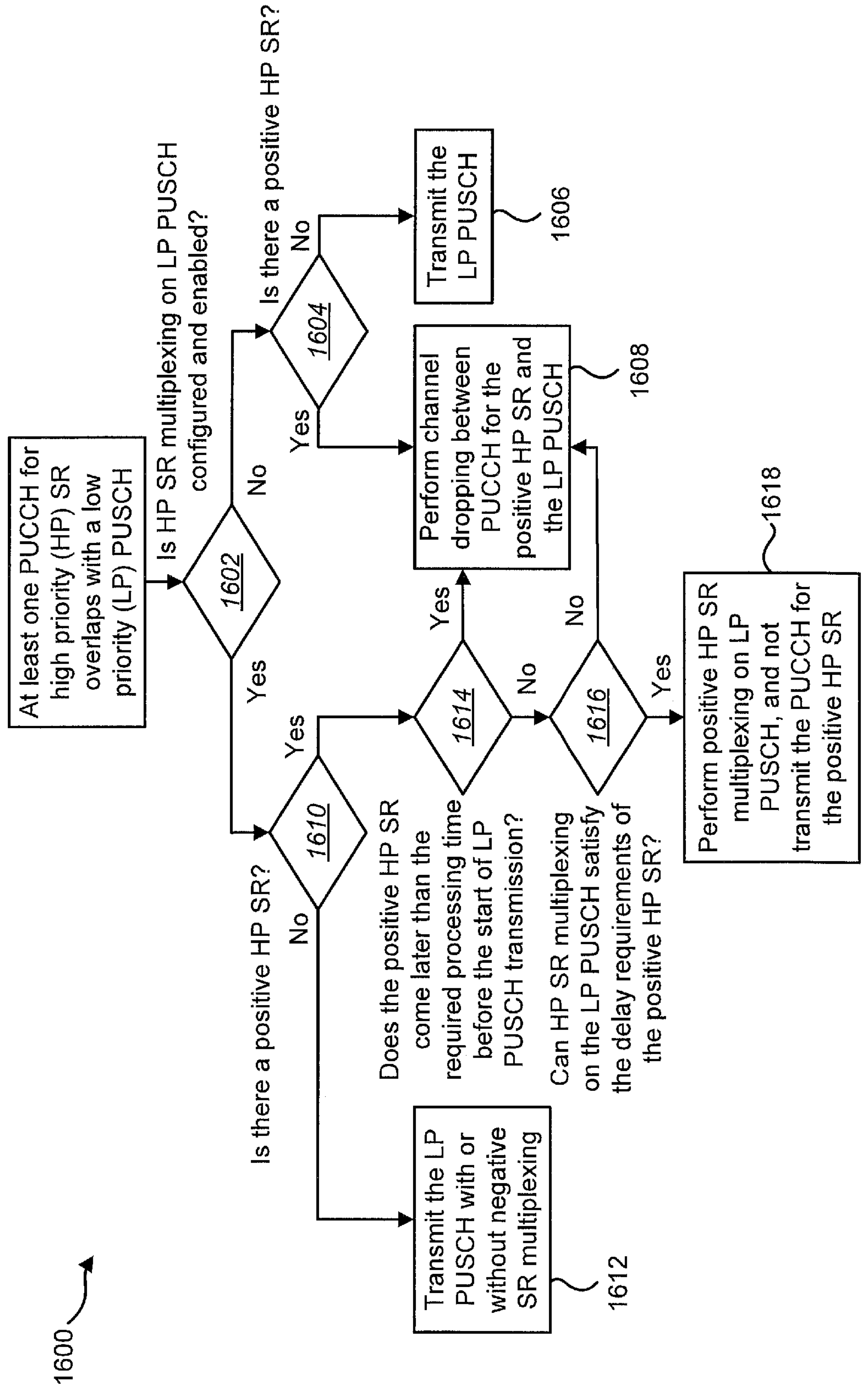
FIG. 16 is a flow diagram illustrating a method of UE behavior for SR multiplexing or channel dropping with HP SR timing and delay considerations.

FIG. 16 is a flow diagram illustrating a method 1600 of UE behavior for SR multiplexing or channel dropping with HP SR timing and delay considerations.

If there is at least one PUCCH for HP SR overlaps with a LP PUSCH, the UE determines 1602 if HP SR multiplexing on LP PUSCH is configured and enabled.

If HP multiplexing on LP PUSCH is not configured/enabled, the UE determines 1604 whether there is a positive HP SR. If there is no positive HP SR, the UE 1606 transmits the LP PUSCH. If there is a positive HP SR, the UE 1608 performs channel dropping between the HP SR PUCCH and the LP PUSCH.

If HP multiplexing on LP PUSCH is configured and enabled, the UE determines 1610 whether there is a positive HP SR triggered. If there is no positive SR triggered, the UE 1612 transmits the LP PUSCH with or without negative SR multiplexing depending on the detailed SR multiplexing on PUSCH methods. If there is a positive HP SR, the UE 1614 evaluates whether the positive HP SR comes later than the required processing time before the start of the LP PUSCH transmission. If the positive HP SR comes after the required processing time before the start of the LP PUSCH transmission, the positive HP SR multiplexing on PUSCH is not possible, the UE 1608 performs channel dropping between the HP SR PUCCH and the LP PUSCH.

If the positive HP SR is known with sufficient processing time before the start of the LP PUSCH transmission, the UE further 1616 evaluates whether the positive HP SR multiplexing on LP PUSCH can satisfy the delay requirements for the given positive HP SR. If the positive HP SR multiplexing on LP PUSCH cannot satisfy the delay requirements for the given positive HP SR, the UE 1608 performs channel dropping between the HP SR PUCCH and the LP PUSCH. If the positive HP SR multiplexing on LP PUSCH can satisfy the delay requirements for the given positive HP SR, the UE 1618 performs positive HP SR multiplexing on LP PUSCH, and does not transmit the PUCCH for the positive HP SR.

When channel dropping is performed, the enhanced channel dropping methods above can be applied, e.g. the dropping is performed based on whether there is UCI on the LP PUSCH and the priority of the UCI multiplexed on LP PUSCH. Additionally, or alternatively, the enhanced method with potential simultaneous SR PUCCH and UCI on PUSCH with partial dropping can be used.

Alternatively, or additionally, the UE will perform SR multiplexing on PUSCH if there is only one HP SR PUCCH resource overlaps with a LP PUSCH and the SR delay requirements can be satisfied. The UE will perform channel dropping if there is a positive HP SR among more than one HP SR PUCCH resources overlapping with the LP PUSCH, or the delay requirements for a positive HP SR cannot be satisfied if the positive HP SR is multiplexed the LP PUSCH.

Some features described in the signaling and configurations of SR multiplexing on PUSCH are the following: SR multiplexing on PUSCH can be configured as a separate feature by a RRC parameter. Different SR multiplexing on PUSCH scenarios can be configured jointly or separately.

Approach 1: only HP SR on LP PUSCH is supported.

Approach 2: only SR on PUSCH with different priorities are supported, including HP SR on LP PUSCH, and LP SR on HP PUSCH.

Approach 3: all cases are supported. SR on PUSCH with the same priority, and SR on PUSCH with different priorities.

The UE behavior follows the SR multiplexing configurations and timeline requirements, as shown in FIG. 16.

If there is at least one PUCCH for HP SR overlaps with a LP PUSCH, and if HP SR multiplexing on LP PUSCH is configured and enabled, (A) If there is no positive SR triggered, the UE transmits the LP PUSCH with or without negative SR multiplexing depending on the detailed SR multiplexing on PUSCH methods.

(B) If there is a positive HP SR, (1) If the positive HP SR comes after the start of the LP PUSCH transmission or within the d symbol SR processing time before the start of the LP PUSCH transmission, or if the positive HP SR multiplexing on LP PUSCH cannot satisfy the delay requirements for the given positive HP SR, the UE performs channel dropping between the HP SR PUCCH and the LP PUSCH.

(2) If a positive HP SR status is known with sufficient time before the LP PUSCH transmission, and if the positive HP SR multiplexing on LP PUSCH can satisfy the delay requirements for the given positive HP SR, the UE performs positive HP SR multiplexing on LP PUSCH, and does not transmit the PUCCH for the positive HP SR.

Methods of multiplexing a high priority SR on a low priority PUSCH In the following, assume SR is not reported on a PUSCH with the same priority, and LP SR cannot be reported on a HP PUSCH. The detailed methods for SR multiplexing on PUSCH are described for the case of a positive HP SR on a LP PUSCH. Moreover, the different approaches of whether or not multiplexing negative SR are included under different scenarios and conditions.

A positive HP SR on a LP PUSCH is the most important use case. Supporting HP SR multiplexing on a LP PUSCH can avoid dropping of HP and/or LP UCI multiplexed and/or data on a LP PUSCH.

Several methods can be considered for SR indication. The methods assume the SR status of the overlapping SR PUCCH resources are known and the timeline requirements of the positive HP SR can be satisfied.

Method 1: a single bit of SR is reported in a reserved resource if a positive SR is triggered.

In one method, a dedicated resource on the PUSCH is configured or reserved to indicate SR, and a single bit of SR is reported if a positive SR is triggered. The reserved resource is not used for SR if there is only negative SR or no SR PUCCH overlaps with the PUSCH. However, with this method, if there are multiple HP SR PUCCH resources overlapping with the LP PUSCH, the gNB cannot tell which SR is triggered.

In one approach, the reserved resource for SR is configured in a similar way as up to 2 bits of HARQ-ACK bit on PUSCH, i.e. the RE resources for a positive SR are mapped with a pattern in the symbol immediately after the first set of DMRS(s) of the PUSCH. To avoid overwrite with potential HARQ-ACK, a different RE pattern can be used from the REs reserved for up to 2 bits of HARQ-ACK.

The number of resource elements (REs) for the SR reporting can be determined based on beta offset value:

(a) In one alternative, a separate parameter, e.g.

$$\beta_{offset}^{SR}$$

is configured to specify the beta offset value for HP SR on LP PUSCH.

(b) In another alternative, the beta offset configured for HP HARQ-ACK on LP PUSCH, e.g.

$$\beta 1_{offset}^{HARQ-ACK},$$

is used as the beta offset value for a HP SR.

(c) Yet in another alternative, the beta offset configured for LP HARQ-ACK on LP PUSCH, e.g.

$$\beta 0_{offset}^{HARQ-ACK},$$

is used as the beta offset value for a HP SR.

In another approach, the reserved resource for SR may be configured with a number of RBs in a symbol. A positive SR is indicated by transmitting a sequence in the configured RBs:

(a) The symbol for the reserved RB resource for SR can be the first symbol or the second symbol immediately after the first set of DMRS(s) of the PUSCH.

(b) The number of RBs can be configured with 1 or more RBs. The number of RBs may be derived based on a beta offset value to determine the number of REs N, then determine the number of RBs by ceil(N/12), i.e. $\lceil N/12 \rceil$. The beta offset value can be separately configured for a HP SR on LP PUSCH, or the beta offset value for HP HARQ-ACK on LP PUSCH, or the beta offset value for LP HARQ-ACK on LP PUSCH.

(c) The sequence may be the same as the sequence derived for the PUCCH resource if the positive SR resource is configured with PUCCH format 0, and the sequence can be the DMRS sequence for the PUCCH resource if the positive SR resource is configured with PUCCH format 1.

(d) The RB location may be from one end of the PUSCH allocation, e.g. from the RB with the smallest index in the PUSCH allocation and up based on the number of RBs, or from the RB with the largest index in the PUSCH allocation and down based on the number of RBs.

Since the SR signaling is located at pre-defined or a configured RB and RE resources, Method 1 is simple to implement. The gNB only needs to detect the reserved resources to check whether SR is indicated or not. The reserved resource should be used only to indicate a positive SR. Negative SR is not reported.

However, the separate mapping for a positive SR introduces additional coding and multiplexing chain on PUSCH. The total number of coding chains on PUSCH may need to be increased if there are other UCIs, including HP HARQ-ACK, LP HARQ-ACK and CSI part 1 and CSI part 2 etc.

Currently, the maximum number of coding chains on PUSCH is 4, for data, HARQ-ACK, CSI part 1 and CSI part 2 respectively. With the introduction of multiplexing HP UCI on a LP PUSCH without increasing the maximum number of coding chains, if both HP HARQ-ACK, LP HARQ-ACK are present, only CSI part 1 can be multiplexed on a LP PUSCH, CSI part 2 will be dropped.

Thus, if a separate coding chain for HP SR is introduced with reserved resources for SR, if a positive HP SR, HP HARQ-ACK, LP HARQ-ACK are all present, if there is also CSI to be multiplexed on the LP PUSCH, all CSI should be dropped including CSI part 1 and CSI part 2 if present.

Furthermore, the reserved resources for HP SR may impact the multiplexing and rate matching of other UCIs and/or data, depending whether negative HP SR is multiplexed on the LP PUSCH or not.

If there is at least a HP SR PUCCH resource overlaps with the LP PUSCH:

(a) In one way, the reserved RE resources for HP SR cannot be used by other UCIs or data. Thus, if there is no positive HP SR, the RE resources are wasted. A negative SR can be reported in the reserved resources, e.g. with an information bit as “0” or “00”. In case of reserved RBs with sequences, different sequences may be used to indicate a positive SR or a negative SR. The gNB only needs to detect in the reserved resources to determine the SR status. Rate matching around the reserved resources are always performed for other UCIs and/or data.

(b) In another way, the reserved RE resources are used by other UCI or data regardless of the SR status. In case of positive SR, the UCI or data on reserved resources are punctured by the positive SR indication. This also requires the gNB to perform blind decoding with different SR assumptions. Furthermore, it will degrade the performance of other UCI if it is multiplexed using these reserved resources.

Figure 17:
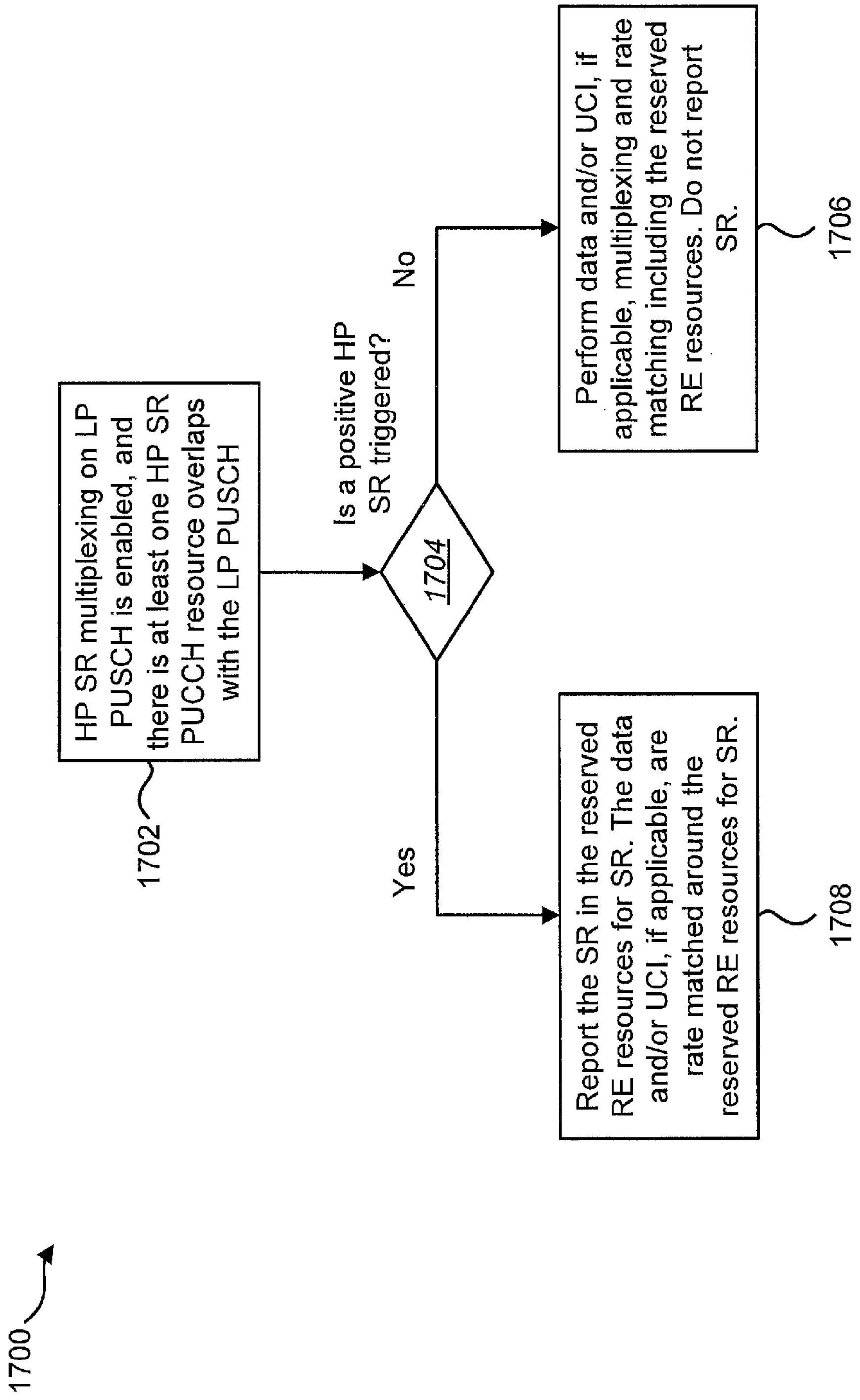
FIG. 17 is a flow diagram illustrating a method of the UE behavior with reserved resources for SR.
Figure 18:
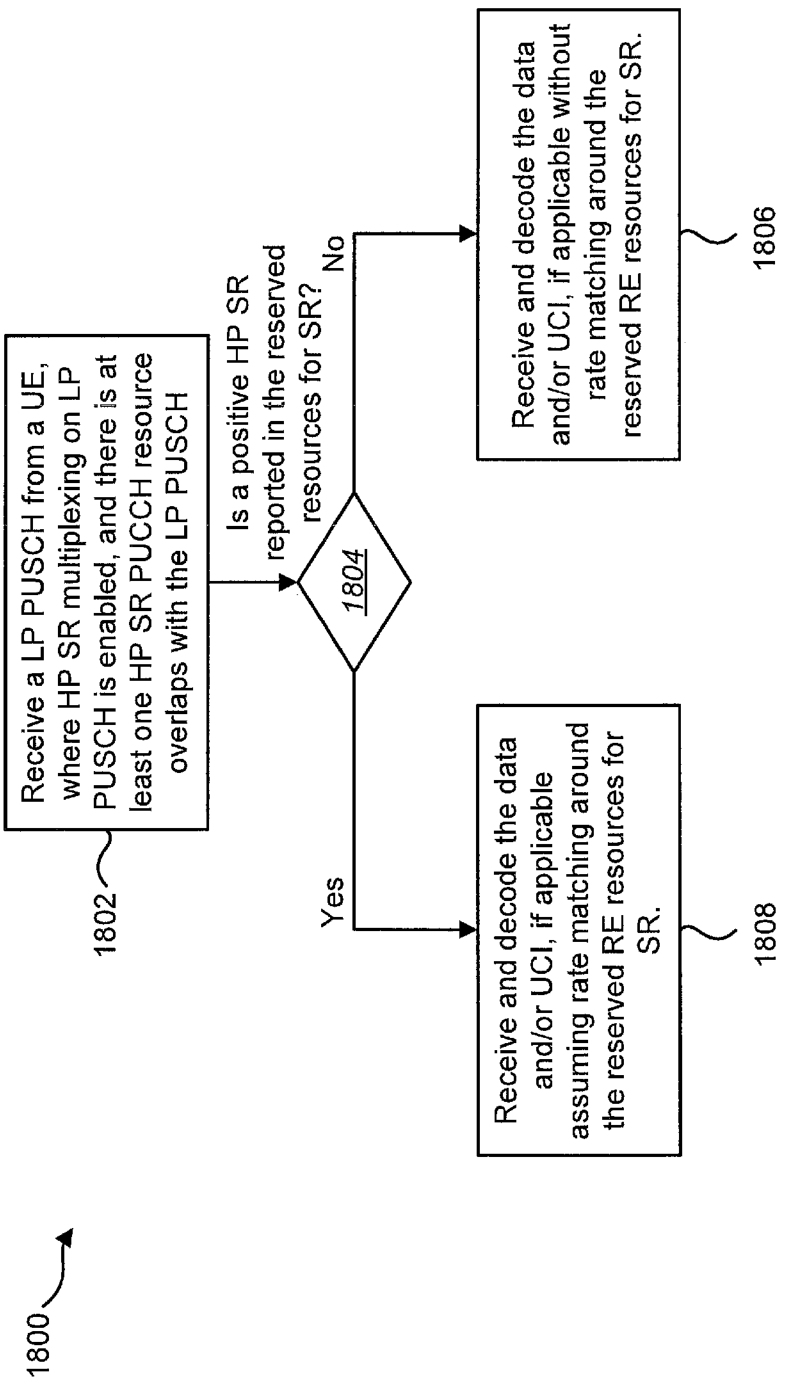
FIG. 18 is a flow diagram illustrating a method of the gNB behavior with SR detection on the reserved resources for SR.

(c) Yet in another way, the reserved RE resources are used for by other UCI or data if there is no positive SR. Thus, the UE can use the reserved resource for other UCIs or data if there is only negative SR. In case of positive SR, the reserved resources are used by SR, and the other UCI or data should perform rate matching around the resources. This will require the gNB to perform blind decoding with different SR status assumptions, thus introducing extra procedures and complexity. FIG. 17 and FIG. 18 show the UE and gNB behavior with this approach. FIG. 17 is a flow diagram illustrating a method of the UE behavior with reserved resources for SR. FIG. 18 is a flow diagram illustrating a method of the gNB behavior with SR detection on the reserved resources for SR.

FIG. 17 is a flow diagram illustrating a method 1700 of the UE behavior with reserved resources for SR. If the UE determines that 1702 HP SR multiplexing on LP PUSCH is enabled and there is at least one PUCCH for HP SR overlaps with a LP PUSCH, the UE determines 1704 whether there is a positive HP SR triggered. If there is no positive HP SR, the UE performs 1706 data and/or UCI, if applicable, multiplexing and rate matching including the reserved RE resources, and does not report a SR. If there is a positive HP SR, the UE 1708 reports the SR in the reserved RE resources for SR, and performs data and/or UCI, if applicable, multiplexing and rate matching around the reserved RE resources for SR.

FIG. 18 is a flow diagram illustrating a method 1800 of the gNB behavior with SR detection on the reserved resources for SR. If the gNB 1802 receives a LP PUSCH from a UE, where HP SR multiplexing on LP PUSCH is enabled, and there is at least one HP SR PUCCH resource overlaps with the LP PUSCH, the gNB evaluate the reserved RE resources for SR, and determines 1804 if a positive HP SR is reported in the reserved RE resources for SR. If there is no positive HP SR detected, the gNB 1806 receives and decodes the data and/or UCI, if applicable without rate matching around the reserved RE resources for SR. If there is a positive HP SR detected, the gNB 1808 receives and decodes the data and/or UCI, if applicable assuming rate matching around the reserved RE resources for SR.

Method 2: A Single Bit of SR is Multiplexed Together with HARQ-ACK or Use Reserved HARQ-ACK Resource.

To avoid additional coding chains for SR, another approach can be used without reserving dedicated resources for SR multiplexing. The SR multiplexing methods are determined by the whether other UCI is multiplexed on the PUSCH and the type of UCI on the PUSCH. And the HP SR may use the same coding chain with a HARQ-ACK, esp. a HP HARQ-ACK.

Case 1: No HARQ-ACK Multiplexed on LP PUSCH.

If there is no configured grant UCI (CG-UCI), and no HARQ-ACK is multiplexed on the PUSCH, the SR needs to be reported separately on PUSCH.

In one approach, a positive SR is reported as 1 bit of HARQ-ACK as “1” on the reserved RE resources for up to 2 bits of HARQ-ACK. Alternatively, since the reserved RE resources assumes two bits of HARQ-ACK, the SR can also be indicated by 2 bits as two bits of HARQ-ACK as “11”.

If there is a positive SR, the SR is multiplexed on the reserved up to 2 bits of HARQ-ACK resources, the other UCI and data should perform rate matching around the reserved RE resources for HARQ-ACK:

(a) In one alternative, for a HP positive SR, the RE resources reserved for the up to 2 bits of HP HARQ-ACK may be used to indicate the positive SR. This alternative ensures the reliability and early delivery of the positive HP SR, especially if the SR PUCCH resource is configured with the same PUCCH-Config as the PUCCH resources for HP HARQ-ACK.

(b) In another alternative, the RE resources reserved for the up to 2 bits of LP HARQ-ACK may be used to indicate the positive SR. This may be applied if the HP SR PUCCH resource is configured with the same PUCCH-Config as the PUCCH resources for LP HARQ-ACK.

For negative SR, in one alternative, negative HP SR may not be reported, so the reserved RE resources for up to 2 bits of HARQ-ACK may not be used by SR in case of negative SR. The other UCI and data should perform rate matching using the reserved RE resources. If the negative HP SR is not reported on the reserved HARQ-ACK resource, the gNB needs to perform blind decoding with different SR assumptions, similar to the procedures in FIG. 17 and FIG. 18.

Thus, alternatively, negative HP SR is reported as "0" or "00" on the reserved RE resources for up to 2 bits of HARQ-ACK. Thus, if there is overlapping HP SR PUCCH resources with a LP PUSCH, the reserved RE resources are used by the SR regardless of the SR status, and the UE should perform rate matching for UCI and other data accordingly.

In another approach, if there is no HARQ-ACK multiplexed on the PUSCH, channel dropping is used. Thus, the positive HP PUCCH will be transmitted and the LP-PUSCH is cancelled. Note in this approach, if there is CSI multiplexed on the LP-PUSCH, the CSI will be dropped as well. To avoid dropping UCI on the LP-PUSCH, yet in another approach, channel dropping is used only if there is no other UCI multiplexed on the LP-PUSCH. Alternatively, or additionally, for both approaches, the UE may apply an enhanced channel dropping method as provided in the previous sections.

Case 2: HP HARQ-ACK is Multiplexed on PUSCH.

If a HP HARQ-ACK is multiplexed on the PUSCH, a bit representing the HP SR can be appended to the HP HARQ-ACK codebook. This includes the case of a HP HARQ-ACK only on PUSCH, and the case of a HP HARQ-ACK and a LP HARQ-ACK on the same PUSCH.

If there is at least one overlapping HP SR PUCCH resources overlap with the LP PUSCH, the SR bit should be present and appended to the HP HARQ-ACK regardless of SR status. Thus, a "1" is appended to the HP HARQ-ACK if there is a positive HP SR, and a "0" is appended to the HP HARQ-ACK if there is a negative HP SR.

The concatenated HP HARQ-ACK and HP SR bits are then multiplexed on the LP PUSCH following the HP HARQ-ACK coding and multiplexing on LP PUSCH method, i.e. the combined bits are coded together, and applying the beta offset for HP HARQ-ACK for coded bits and multiplexing on PUSCH.

(a) For a codebook with 1 bit of HP HARQ-ACK, one HP SR bit is appended to the HP HARQ-ACK to form 2 bits, and the two resulting two bits are multiplexed on the RE resources reserved for up to 2 bits of HP HARQ-ACK on the LP PUSCH.

(b) For a codebook with greater or equal to 2 bits of HP HARQ-ACK, the 1 bits of HP SR is appended to the end of the HP HARQ-ACK codebook. Since the combined HARQ-ACK and SR are more than 2 bits, the combined HARQ-ACK and SR bits are encoded, and rate matched following the HP HARQ-ACK multiplexing procedures.

Thus, in case 2, the SR bit is multiplexed together with the HP HARQ-ACK regardless of SR status, i.e, the SR bit is appended even with negative SR.

For UCI reporting on PUCCH, the HP SR and HP HARQ-ACK can be joint reported on a single PUCCH only if the HP SR PUCCH resource overlaps with the HP HARQ-ACK PUCCH. However, for UCI multiplexing on PUSCH, i.e. the HP HARQ-ACK overlapping with LP PUSCH is evaluated separately from the HP SR PUCCH overlapping with the LP PUSCH. Thus, the HARQ-ACK and SR multiplexing is not a result of HARQ-ACK and SR joint reporting from overlapping conditions between the HARQ-ACK PUCCH and the SR PUCCH. The HP HARQ-ACK and HP SR joint multiplexing on LP PUSCH is applied even if there is no overlapping between the HP HARQ-ACK PUCCH and the HP SR PUCCH.

Case 3: Only LP HARQ-ACK is Multiplexed on PUSCH.

If HP HARQ-ACK is not present but LP-HARQ-ACK is multiplexed on the PUSCH, two approaches can be considered.

In one approach, a bit representing HP SR can be appended to the LP HARQ-ACK codebook. If there is at least one overlapping HP SR PUCCH resources overlap with the LP PUSCH, the SR bit should be present and appended to the LP HARQ-ACK regardless of SR status. Thus, a "1" is appended to the LP HARQ-ACK if there is a positive HP SR, and a "0" is appended to the LP HARQ-ACK if there is a negative HP SR.

The concatenated LP HARQ-ACK and the HP SR bit are then multiplexed on the LP PUSCH following the LP HARQ-ACK coding and multiplexing on LP PUSCH method, i.e. the combined bits are coded together, and applying the beta offset for LP HARQ-ACK for multiplexing on LP PUSCH.

(a) For a codebook with 1 bit of LP HARQ-ACK, one HP SR bit is appended to the LP HARQ-ACK to form 2 bits, and the two resulting two bits are multiplexed on the RE resources reserved for up to 2 bits of LP HARQ-ACK on the LP PUSCH.

(b) For a codebook with greater or equal to 2 bits of LP HARQ-ACK, the 1 bits of HP SR is appended to the end of the LP HARQ-ACK codebook. Since the combined HARQ-ACK and SR are more than 2 bits, the combined HARQ-ACK and SR bits are encoded, and rate matched following the LP HARQ-ACK multiplexing procedures.

Similarly, for UCI reporting on PUCCH, the HP SR and LP HARQ-ACK can be joint reported on a single PUCCH only if the HP SR PUCCH resource overlaps with the LP HARQ-ACK PUCCH. However, for UCI multiplexing on PUSCH, i.e. the LP HARQ-ACK overlapping with LP PUSCH is evaluated separately from the HP SR PUCCH overlapping with the LP PUSCH. Thus, the HARQ-ACK and SR multiplexing is not a result of HARQ-ACK and SR joint reporting from overlapping conditions between the HARQ-ACK PUCCH and the SR PUCCH. The LP HARQ-ACK and HP SR joint multiplexing on LP PUSCH is applied even if there is no overlapping between the LP HARQ-ACK PUCCH and the HP SR PUCCH.

This approach jointly reports HP SR with the LP HARQ-ACK, so the HP SR is provided with the same BER performance as LP HARQ-ACK. In case of frequency hopping is configured and the LP HARQ-ACK is mapped into both hops, the UE needs to wait the second HARQ-ACK multiplexed segments before it can extract the HP SR status.

To avoid the potential issues, in another approach, if there is a positive HP SR, the positive HP SR is reported as 1 bit of HP HARQ-ACK as "1" on the reserved RE resources for up to 2 bits of HP HARQ-ACK. Since the reservice resources assumes two bits of HARQ-ACK, the SR can also be indicated by 2 bits as two bits of HARQ-ACK as "11".

The other UCI, including the LP HARQ-ACK, and data should perform rate matching around the reserved RE resources for up to 2 bits of HP HARQ-ACK. In this approach, with one alternative negative HP SR may not be reported, so the reserved RE resources for up to 2 bits of HP HARQ-ACK may not be used by HP SR in case of negative HP SR. The other UCI, including LP HARQ-ACK and data should perform rate matching using the reserved RE resources. If the negative HP SR is not reported on the reserved HP HARQ-ACK resource, the gNB needs to perform blind decoding with different HP SR assumptions. Thus, in another alternative, negative HP SR is reported as "0" or "00" on the reserved RE resources for up to 2 bits of HP HARQ-ACK. In another word, the SR multiplexing method for no HARQ-ACK case on the HP HARQ-ACK reserved resource can be used for the LP HARQ-ACK only case.

Figure 19:
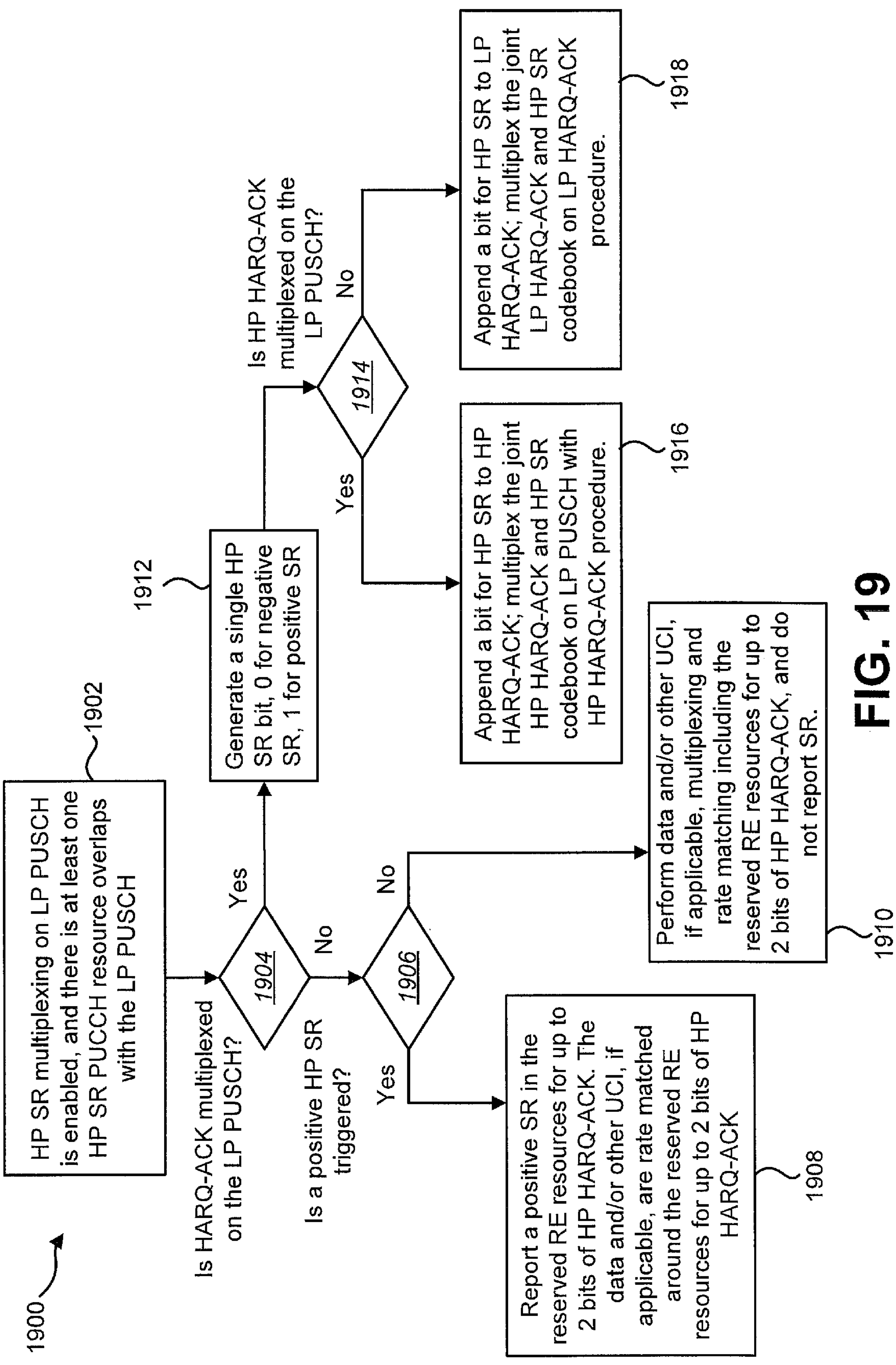
FIG. 19 is a flow diagram illustrating a method of SR multiplexing with 1 bit for SR based on whether other UCI is present and the UCI type.

FIG. 19 is a flow diagram summarizing some approaches of method 2. FIG. 19 is a flow diagram illustrating a method 1900 of SR multiplexing with 1 bit for SR based on whether other UCI is present and the UCI type. If the UE determines that 1902 HP SR multiplexing on LP PUSCH is enabled and there is at least one PUCCH for HP SR overlaps with a LP PUSCH, the UE then evaluates 1904 whether there is HARQ-ACK to be multiplexed on the LP PUSCH. If there is no HARQ-ACK to be multiplexed on the LP PUSCH, the UE determines 1906 if a positive HP SR is triggered. If there is a positive HP SR, the UE 1908 reports a positive SR in the reserved RE resources for up to 2 bits of HP HARQ-ACK, and performs data and/or other UCI, if applicable, multiplexing and rate matching around the reserved RE resources for up to 2 bits of HP HARQ-ACK. If there is no positive HP SR, the UE 1910 performs data and/or other UCI, if applicable, multiplexing and rate matching including the reserved RE resources for up to 2 bits of HP HARQ-ACK, and does not report SR. If there is HARQ-ACK to be multiplexed on the LP PUSCH, the UE 1912 generates a single HP SR bit with 0 for negative SR and 1 for positive SR. The UE then evaluates 1914 if there is HP HARQ-ACK to be multiplexed on the LP PUSCH. If there is HP HARQ-ACK to be multiplexed on the LP PUSCH, the UE 1916 appends a bit for HP SR to HP HARQ-ACK, and multiplexes the joint HP HARQ-ACK and HP SR codebook on LP PUSCH with HP HARQ-ACK procedure. If there is no HP HARQ-ACK, but there is a LP HARQ-ACK to be multiplexed on the LP PUSCH, the UE 1918 appends a bit for HP SR to LP HARQ-ACK, and multiplexes the joint LP HARQ-ACK and HP SR codebook on LP PUSCH with LP HARQ-ACK procedure.

Some benefits of Method 2 are:

(a) No need to reserve dedicated resources for SR.

(b) Reuse existing HARQ-ACK coding chain and multiplexing methods.

Method 3: The index of a positive SR is also reported.

The methods above indicate a positive HP SR with only 1 bit. If there are multiple HP SR PUCCH resources overlapping with the LP PUSCH, the gNB cannot know which SR is triggered when a positive SR is reported. Therefore, enhancements can be considered to include 1 or more bits representing SR depending on the overlapping conditions between the HP SR PUCCH resources and the LP-PUSCH.

A number of SR bits is generated based on the overlapping conditions between the HP SR PUCCH configurations and the LP PUSCH. In case of only one HP SR PUCCH resource overlaps with the LP-PUSCH, 1 bit of SR is generated, the method 2 above can be applied.

If a UE is configured to transmit K PUCCHs for respective K SRs with priority index 1 in a slot, as determined by a set of schedulingRequestResourceId and schedulingRequestIDForBFR, with SR transmission occasions that would overlap with a transmission of a PUSCH with priority index 0 from the UE in the slot. The UE would generate $\lceil \log_2(K+1) \rceil$ bits representing a negative or positive SR, in ascending order of the values of schedulingRequestResourceId and schedulingRequestIDForBFR. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

Case 1: No HARQ-ACK is Multiplexed on the LP PUSCH.

If no HARQ-ACK is multiplexed on the LP PUSCH, the $\lceil \log_2(K+1) \rceil$ bits of HP SR can be reported following a HP HARQ-ACK multiplexing procedure.

(A) If the number of HP SR bits $\lceil \log(K+1) \rceil$ is less or equal to 2, the SR bits are reported on the reserved RE resources for up to 2 bits of HARQ-ACK.

(a) In one alternative, for a HP positive SR, the RE resources reserved for the up to 2 bits of HP HARQ-ACK may be used to indicate the positive SR. Especially if the SR PUCCH resource is configured with the same PUCCH-Config as the PUCCH resources for HP HARQ-ACK.

(b) In another alternative, the RE resources reserved for the up to 2 bits of LP HARQ-ACK may be used to indicate the positive SR if the SR PUCCH resource is configured with the same PUCCH-Config as the PUCCH resources for LP HARQ-ACK.

(c) Negative SR may not be reported, so the reserved RE resources for up to 2 bits of HARQ-ACK may not be used by SR in case of negative SR. The other UCI and data should perform rate matching using the reserved RE resources. If the negative HP SR is not reported on the reserved HARQ-ACK resource, the gNB needs to perform blind decoding with different SR assumptions. Thus, alternatively, negative HP SR is reported as "0" or "00" on the reserved RE resources for up to 2 bits of HARQ-ACK.

(B) If the number of HP SR bits $\lceil \log_2(K+1) \rceil$ is greater than 2, UE reports the $\lceil \log_2(K+1) \rceil$ bits with the HP HARQ-ACK multiplexing method on the LP PUSCH, i.e. $O_{UCI}=O_{ACK}+\lceil \log_2(K+1) \rceil$ where $O_{AIK}=0$. Alternatively, UE reports the $\lceil \log_2(K+1) \rceil$ bits with the LP HARQ-ACK multiplexing method on the LP PUSCH. Especially if the HP SR PUCCH resource is configured with the same PUCCH-Config as the PUCCH resources for LP HARQ-ACK.

(a) Note in this case, the SR bit should be reported regardless of SR status. Thus, for all negative HP SR, all zeros are reported using the HARQ-ACK procedure.

(b) Alternatively, all negative SRs may not be reported. However, if the negative HP SR is not reported, the gNB needs to perform blind decoding with different SR assumptions.

In another approach, since there is no HARQ-ACK, SR should be reported separately by itself, the SR can be reported as 1 bit as in Method 2 above regardless the number of overlapping HP SR PUCCH resources.

Yet in another approach, if there is no HARQ-ACK multiplexed on the PUSCH, channel dropping is used. Thus, the positive HP PUCCH will be transmitted and the LP-PUSCH is cancelled. Note in this approach, if there is CSI multiplexed on the LP-PUSCH, the CSI will be dropped as well. To avoid dropping UCI on the LP-PUSCH, yet in another approach, channel dropping is used only if there is no other UCI multiplexed on the LP-PUSCH. Alternatively, or additionally, for both approaches, the UE may apply an enhanced channel dropping method as provided in the previous sections.

Case 2: HP HARQ-ACK is Multiplexed on PUSCH.

If HP HARQ-ACK is multiplexed on the PUSCH, the $\lceil \log_2(K+1) \rceil$ SR bits can be appended to the HP HARQ-ACK codebook regardless of positive or negative status. This includes the case of HP HARQ-ACK only on PUSCH, and the case of HP HARQ-ACK and LP HARQ-ACK on the same PUSCH.

The concatenated HP HARQ-ACK and HP SR bits are then multiplexed on the LP PUSCH following the HP HARQ-ACK coding and multiplexing on LP PUSCH method, i.e. the combined bits are coded together, and applying the beta offset for HP HARQ-ACK for multiplexing on PUSCH.

If a UE would transmit $O_{ACK}$ HP HARQ-ACK information bits, $\lceil \log_2(K+1) \rceil$ bits representing a negative or positive HP SR, in ascending order of the values of schedulingRequestResourceId and schedulingRequestIDForBFR, are appended to the HARQ-ACK information bits and the UE reports the combined $O_{UCI}=O_{ACK}+\lceil \log_2(K+1) \rceil$ bits with the HP HARQ-ACK multiplexing method on LP PUSCH. Thus, (a) For a codebook with 1 bit of HP HARQ-ACK and 1 bit of SR bit, i.e. only one HP SR PUCCH overlaps with the LP-PUSCH, $O_{UI}=O_{ACK}+\lceil \log_2(K+1) \rceil=2$, the 1 bit for HP SR is appended to the 1-bit HP HARQ-ACK to form 2 bits, and the resulting two bits are multiplexed on the RE resources reserved for up to 2 bits of HP HARQ-ACK.

(b) If $O_{UCI}=O_{ACK}+\lceil \log_2(K+1) \rceil$ is greater than 2 bits, the $\lceil \log_2(K+1) \rceil$ bits for HP SR are appended to the end of the HP HARQ-ACK codebook, and the combined HP HARQ-ACK and HP SR bits are encoded, and rate matched following the HP HARQ-ACK multiplexing procedures.

Case 3: Only LP HARQ-ACK is Multiplexed on PUSCH.

If HP HARQ-ACK is not present but LP-HARQ-ACK is multiplexed on the PUSCH, two approaches can be considered.

In one approach, the $\lceil \log_2(K+1) \rceil$ SR bits can be appended to the LP HARQ-ACK codebook. The concatenated LP HARQ-ACK and HP SR bits are then multiplexed on the LP PUSCH following the LP HARQ-ACK coding and multiplexing on LP PUSCH method, i.e. the combined bits are coded together, and applying the beta offset for LP HARQ-ACK for multiplexing on LP PUSCH.

(a) For a codebook with 1 bit of LP HARQ-ACK and 1 bit of SR bit, i.e. only one HP SR PUCCH overlaps with the LP-PUSCH, $O_{UCI}=O_{ACK}+\lceil \log_2(K+1) \rceil=2$, the 1 bit for HP SR is appended to the 1-bit LP HARQ-ACK to form 2 bits, and the resulting two bits are multiplexed on the RE resources reserved for up to 2 bits of LP HARQ-ACK.

(b) If $O_{UCI}=O_{ACK}+\lceil \log_2(K+1) \rceil$ is greater than 2 bits, the $\lceil \log_2(K+1) \rceil$ bits for HP SR are appended to the end of the LP HARQ-ACK codebook, and the combined LP HARQ-ACK and HP SR bits are encoded, and rate matched following the LP HARQ-ACK multiplexing procedures.

This approach jointly reports HP SR with the LP HARQ-ACK, so the HP SR is provided with the same BER performance as LP HARQ-ACK. In case frequency hopping is configured and the P HARQ-ACK is mapped into both hops, the UE has to wait for the second HARQ-ACK multiplexed segments before it can extract the HP SR status.

To avoid the potential issue, in another approach, the $\lceil \log_2(K+1) \rceil$ HP SR bits are reported as HP HARQ-ACK following the HP HARQ-ACK multiplexing on LP PUSCH procedure. Thus, the approaches for Case 1 without HARQ-ACK on the LP PUSCH is applied also for Case 3 with only LP HARQ-ACK multiplexed on LP PUSCH.

Figure 20:
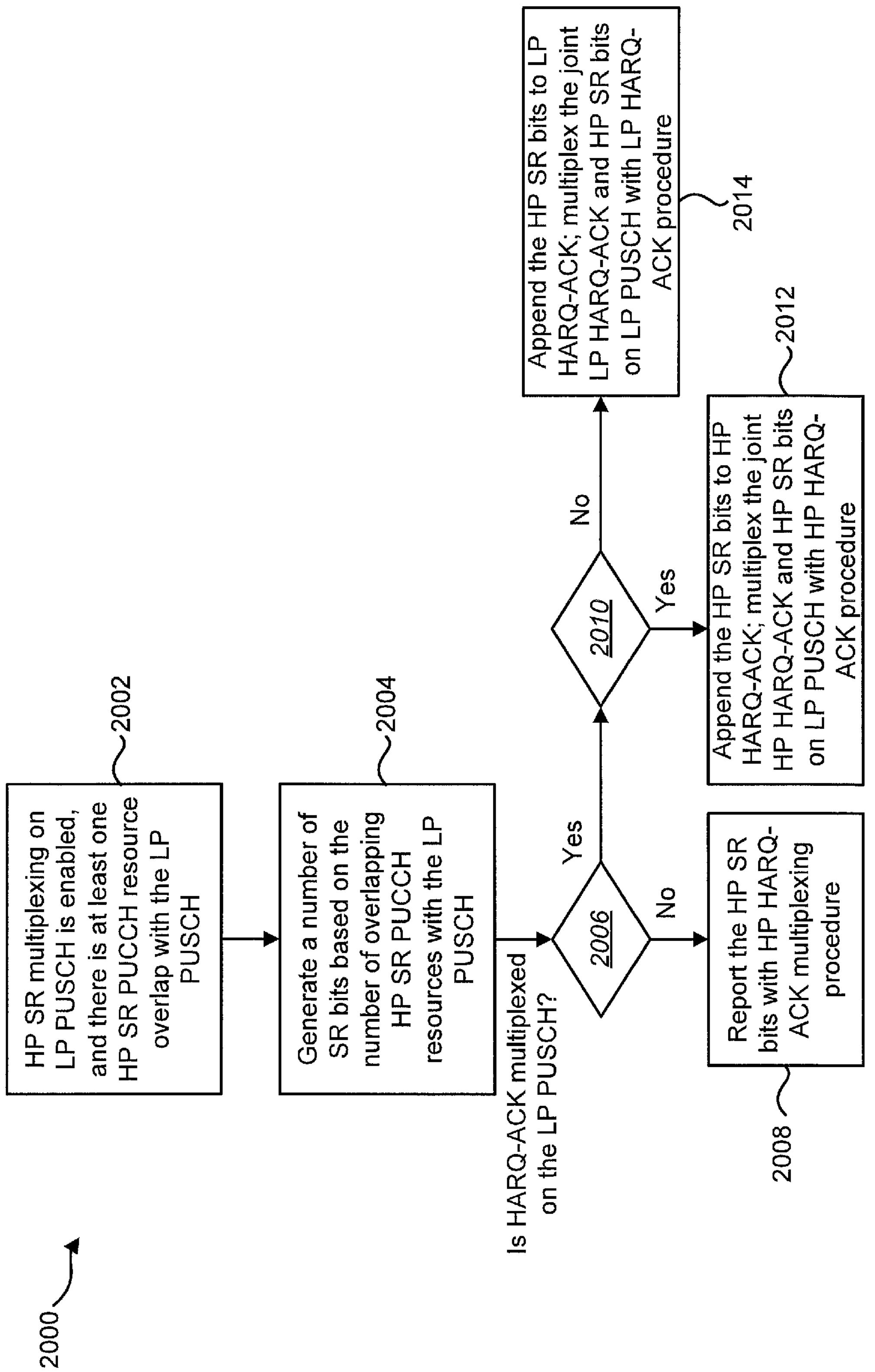
FIG. 20 is a flow diagram illustrating a method of HP SR multiplexing on LP PUSCH with SR index indication.

FIG. 20 is a flow diagram that summarizes some approaches of method 3. FIG. 20 is a flow diagram illustrating a method 2000 of HP SR multiplexing on LP PUSCH with SR index indication. If the UE determines that 2002 HP SR multiplexing on LP PUSCH is enabled and there is at least one PUCCH for HP SR overlaps with a LP PUSCH, the UE 2004 generates a number of SR bits based on the number of overlapping HP SR PUCCH resources with the LP PUSCH. The UE then evaluates 2006 whether there is HARQ-ACK to be multiplexed on the LP PUSCH. If there is no HARQ-ACK to be multiplexed on the LP PUSCH, the UE 2008 reports the HP SR bits with the HP HARQ-ACK multiplexing procedure. If there is HARQ-ACK to be multiplexed on the LP PUSCH, the UE evaluates 2010 if there is HP HARQ-ACK to be multiplexed on the LP PUSCH. If there is HP HARQ-ACK to be multiplexed on the LP PUSCH, the UE 2012 appends the HP SR bits to HP HARQ-ACK, and multiplexes the joint HP HARQ-ACK and HP SR codebook on LP PUSCH with HP HARQ-ACK procedure. If there is no HP HARQ-ACK, but there is a LP HARQ-ACK to be multiplexed on the LP PUSCH, the UE 2014 appends the HP SR bits to LP HARQ-ACK, and multiplexes the joint LP HARQ-ACK and HP SR codebook on LP PUSCH with LP HARQ-ACK procedure.

Benefits of Method 3:

(a) The positive SR index is reported to gNB, so the gNB knows exactly which SR is triggered.

(b) No need to reserve dedicated resources for SR.

(c) Reuse existing HARQ-ACK coding chain and multiplexing methods.

Alternatively, or additionally, the number of SR bits multiplexed with the HARQ-ACK may be determined based on the number of HARQ-ACK bits. For example, (a) If there is no HARQ-ACK, or the number of HARQ-ACK bits is less or equal to 2 bits, only 1 bit of SR is generated as in Method 2 above.

(b) If the number of HARQ-ACK bits is more than 2 bits, $\lceil \log_2(K+1) \rceil$ SR bits are generated based on the overlapping HP SR PUCCH resources with the LP PUSCH.

Regarding the methods of multiplexing a high priority positive SR on a low priority PUSCH, various features were described as follows:

If HP SR multiplexing on LP PUSCH is enabled, and there is at least one overlapping HP PUCCH resource with the LP PUSCH, Method 1: A positive HP SR is reported on reserved RE resources for SR. For negative SR: (Alternative 1): Negative SR is not reported. In this case, the gNB needs to perform SR detection first to determine the multiplexing resources for other UCI and/or data, or (Alternative 2): Negative SR is reported on the reserved resources.

With method 1, a separate coding chain is used for SR. Thus, to keep the maximum coding chains for PUSCH unchanged, if SR, HP HARQ-ACK, LP PUSCH and CSI are all multiplexed on the LP PUSCH, the CSI, including both CSI part 1 and CSI part 2 if present, is dropped.

In some examples Case 1 may be combined with method 2. E.g. If there is no HARQ-ACK multiplexed on the LP PUSCH, the up to 2 bits of HARQ-ACK resources are used as reserved resources for SR.

Case 1: If there is No HARQ-ACK Multiplexed on LP PUSCH:

Method 1: A positive HP SR is reported on reserved RE resources for up to 2 bits of HP HARQ-ACK. For negative SR: (Alternative 1): Negative SR is not reported. The gNB needs to perform SR detection first to determine the multiplexing resources for other UCI and/or data, or (Alternative 2): Negative SR is reported as 0 on the reserved RE resources.

If HP SR multiplexing on LP PUSCH is enabled, and there is at least one overlapping HP PUCCH resource with the LP PUSCH, different SR multiplexing method can be used based on whether HARQ-ACK is multiplexing and the priority of the HARQ-ACK.

There may be different methods for Case 1/2/3:

(A) If there is no HARQ-ACK multiplexed on PUSCH, the HP SR is reported following HP HARQ-ACK procedures using reserved REs for HP HARQ-ACK.

(B) If there is HARQ-ACK multiplexed on PUSCH, the HP SR is jointly reported with a HARQ-ACK.

(1) If there is HP HARQ-ACK multiplexed on PUSCH, the HP SR is jointly reported with HP HARQ-ACK following HP HARQ-ACK multiplexing procedures.

(2) If there is only LP HARQ-ACK multiplexed on PUSCH, the HP SR is jointly reported with LP HARQ-ACK following LP HARQ-ACK multiplexing procedures.

In another example, where case 3 uses the same method as case 1:

(a) If there is no HP HARQ-ACK multiplexed on PUSCH, the HP SR is reported following HP HARQ-ACK multiplexing procedures using reserved REs for HP HARQ-ACK.

(b) If there is HP HARQ-ACK multiplexed on PUSCH, the HP SR is jointly reported with HP HARQ-ACK following HP HARQ-ACK multiplexing procedures.

Details of each methods are given below.

Case 1: If there is No HARQ-ACK Multiplexed on LP PUSCH.

Method 1: A positive HP SR is reported on reserved RE resources for up to 2 bits of HP HARQ-ACK. For negative SR: (Alternative 1): Negative SR is not reported. The gNB needs to perform SR detection first to determine the multiplexing resources for other UCI and/or data, or (Alternative 2): Negative SR is reported as 0 on the reserved RE resources.

Method 2: A number of HP SR bits are generated based on the number of overlapping HP SR PUCCH resources with the LP PUSCH, regardless of SR status. The HP SR bits are multiplexed with HP HARQ-ACK multiplexing on PUSCH procedure.

Case 2: If there is HP HARQ-ACK Multiplexing on LP PUSCH, Including the Case with HP HARQ-ACK Only, and the Case with HP HARQ-ACK and LP HARQ-ACK Append HP SR Bit(s) to HP HARQ-ACK, and Multiplex on LP PUSCH Following HP HARQ-ACK Procedure.

Method 1: A single bit is generated for HP SR, 0 for negative SR and 1 for positive SR.

Method 2: A number of SR bits are generated based on overlapping HP SR PUCCH resources between the HP SR PUCCH configurations and the LP PUSCH.

Case 3: If there is Only LP HARQ-ACK Multiplexed on LP PUSCH.

Method 1: Append HP SR bit(s) to LP HARQ-ACK, and multiplex on LP PUSCH following LP HARQ-ACK procedure.

Approach 1: A single bit is generated for HP SR, 0 for negative SR and 1 for positive SR.

Approach 2: A number of HP SR bits are generated based on the number of overlapping HP SR PUCCH resources with the LP PUSCH, regardless of SR status.

Method 2: Report HP SR bit(s) with HP HARQ-ACK procedure as in Case 1.

Approach 1: A positive HP SR is reported on reserved RE resources for up to 2 bits of HP HARQ-ACK. For negative SR: (Alternative 1): Negative SR is not reported. The gNB needs to perform SR detection first to determine the multiplexing resources for other UCI and/or data, or For negative SR: (Alternative 2): Negative SR is reported as 0 on the reserved RE resources.

Approach 2: A number of HP SR bits are generated based on the number of overlapping HP SR PUCCH resources with the LP PUSCH, regardless of SR status. The HP SR bits are multiplexed with HP HARQ-ACK procedure.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:
- a processor configured to determine, based on a radio resource control (RRC) parameter, scheduling request (SR) multiplexing on a physical uplink shared channel (PUSCH); and
- transmitting circuitry configured to:
  - in a case that (i) at least one physical uplink control channel (PUCCH) for high priority (HP) SR overlaps with a low priority (LP) PUSCH, (ii) HP SR multiplexing on the LP PUSCH is configured and enabled, and (iii) a positive HP SR exists,
    - perform channel dropping between an HP SR PUCCH and the LP PUSCH in a case that:
      - the positive HP SR exists after a start of an LP PUSCH transmission or within a delay SR processing time before the start of the LP PUSCH transmission, or
      - the positive HP SR multiplexing on the LP PUSCH does not satisfy delay requirements for the positive HP SR, and
    - perform positive HP SR multiplexing on the LP PUSCH and forgo transmitting a PUCCH for the positive HP SR in a case that:
      - a positive HP SR status is known before the LP PUSCH transmission, and
      - the positive HP SR multiplexing on the LP PUSCH does satisfy the delay requirements for the positive HP SR.

2. The UE of claim 1, wherein the transmitting circuitry is further configured to:
- transmit the LP PUSCH in a case that:
  - the HP SR multiplexing on the LP PUSCH is not configured and enabled, and
  - no positive HP SR exists.

3. A base station (gNB), comprising:
- a processor configured to determine, based on a radio resource control (RRC) parameter, scheduling request (SR) multiplexing on a physical uplink shared channel (PUSCH); and
- receiving circuitry configured to:
  - in a case that (i) at least one physical uplink control channel (PUCCH) for high priority (HP) SR overlaps with a low priority (LP) PUSCH, (ii) HP SR multiplexing on the LP PUSCH is configured and enabled, and (iii) a positive HP SR exists,
    - perform channel dropping between an HP SR PUCCH and the LP PUSCH in a case that:
      - the positive HP SR exists after a start of an LP PUSCH transmission or within a delay SR processing time before the start of the LP PUSCH transmission, or
      - the positive HP SR multiplexing on the LP PUSCH does not satisfy delay requirements for the positive HP SR, and
    - perform positive HP SR multiplexing on the LP PUSCH and forgo receiving a PUCCH for the positive HP SR in a case that:
      - a positive HP SR status is known before the LP PUSCH transmission, and
      - the positive HP SR multiplexing on the LP PUSCH does satisfy the delay requirements for the positive HP SR.

4. The gNB of claim 3, wherein the receiving circuitry is further configured to:

receive the LP PUSCH in a case that:

the HP SR multiplexing on the LP PUSCH is not configured and enabled, and no positive HP SR exists.

* * * * *